US012333044B2

(12) United States Patent
Konoura et al.

(10) Patent No.: US 12,333,044 B2
(45) Date of Patent: Jun. 17, 2025

(54) INFORMATION PROCESSING SYSTEM, INFORMATION PROCESSING METHOD, AND COMPUTER

(71) Applicant: Hitachi, Ltd., Tokyo (JP)

(72) Inventors: Hiroaki Konoura, Tokyo (JP); Masafumi Kinoshita, Tokyo (JP); Keisuke Shirai, Tokyo (JP)

(73) Assignee: HITACHI, LTD., Tokyo (JP)

( * ) Notice: Subject to any disclaimer, the term of this patent is extended or adjusted under 35 U.S.C. 154(b) by 318 days.

(21) Appl. No.: 18/022,357

(22) PCT Filed: Aug. 19, 2021

(86) PCT No.: PCT/JP2021/030406
§ 371 (c)(1),
(2) Date: Feb. 21, 2023

(87) PCT Pub. No.: WO2022/107406
PCT Pub. Date: May 27, 2022

(65) Prior Publication Data
US 2023/0315900 A1    Oct. 5, 2023

(30) Foreign Application Priority Data

Nov. 17, 2020 (JP) ................................ 2020-190785

(51) Int. Cl.
G06F 21/62 (2013.01)
G06F 16/903 (2019.01)

(52) U.S. Cl.
CPC .... *G06F 21/6245* (2013.01); *G06F 16/90335* (2019.01)

(58) Field of Classification Search
CPC ................ G06F 21/6245; G06F 16/90335
See application file for complete search history.

(56) References Cited

U.S. PATENT DOCUMENTS 11,853,366 B1 * 12/2023 Bhushan ................. G06F 3/011
11,860,940 B1 *  1/2024 Batsakis ............. G06F 16/2471
(Continued)

FOREIGN PATENT DOCUMENTS

JP    2009-237975 A    10/2009

OTHER PUBLICATIONS

Extended European Search Report received in corresponding European Application No. 21894281.1 dated Sep. 13, 2024.
(Continued)

*Primary Examiner* — Frantz B Jean
(74) *Attorney, Agent, or Firm* — MATTINGLY & MALUR, PC

(57) ABSTRACT

An information processing system includes first and second computers and first and second bases. The first computer stores, as personal information of a user of a terminal, personal management information including an ID and contact detail of the user, generates personal time-series information with personal information and time added and generates processed time-series information by performing concealment on the personal information in the personal time-series information. The processed time-series information is transmitted to the second computer, which generates search range information for the processed time-series information from a search condition for the processed time-series information for specifying the user at the first base and a message to be transmitted to the user at the first base, and transmits the search range information to the first computer, and the first computer specifies the user by searching for the personal time-series information, with the search condition of the received search range information.

15 Claims, 19 Drawing Sheets

(56) References Cited

U.S. PATENT DOCUMENTS

2020/0125765 A1* 4/2020 Park .................. G05B 15/02
2020/0210850 A1* 7/2020 Nuthi ................. G06N 3/084

OTHER PUBLICATIONS

International Search Report of PCT/JP2021/030406 dated Oct. 19, 2021.

* cited by examiner

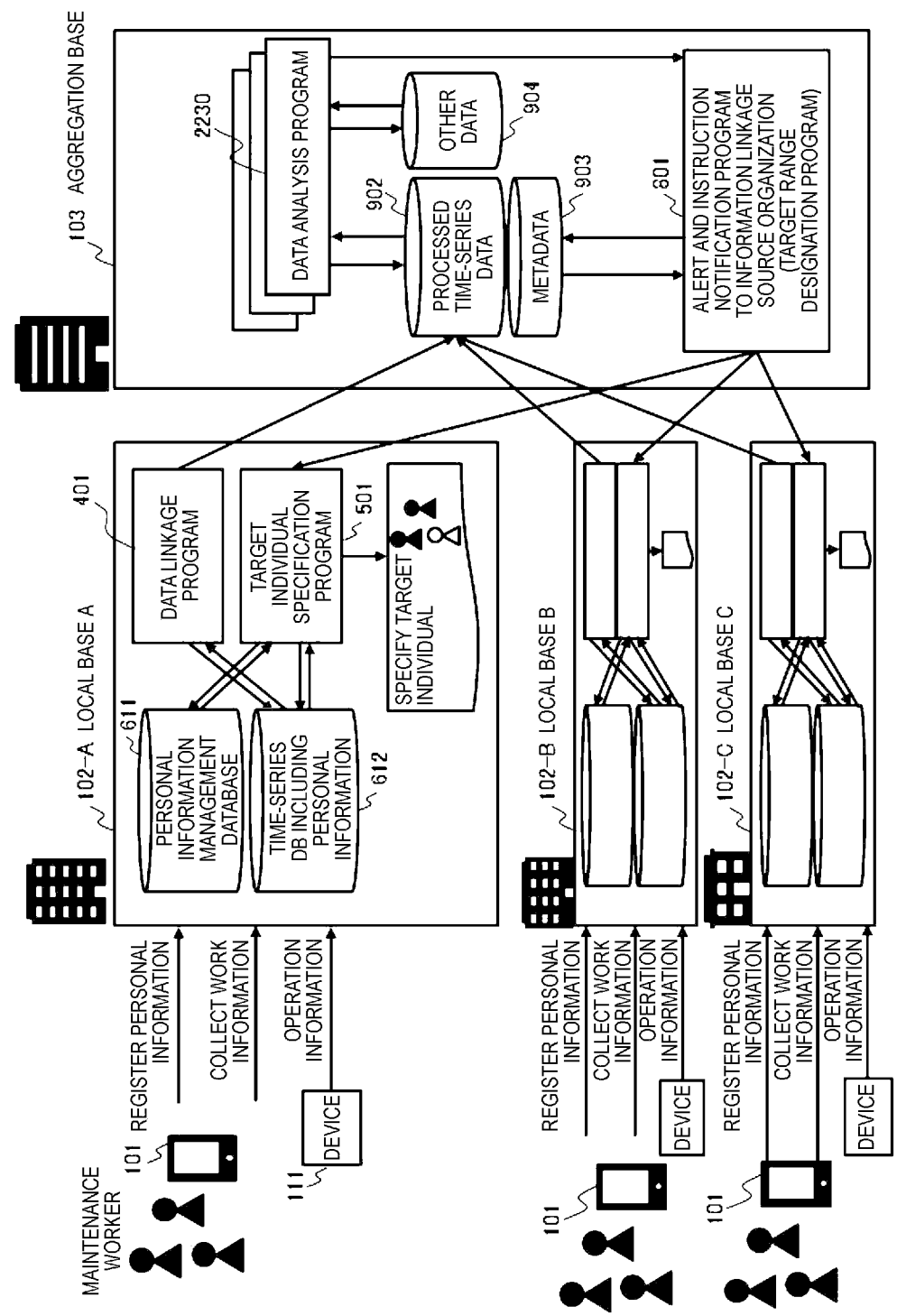
[FIG. 1]

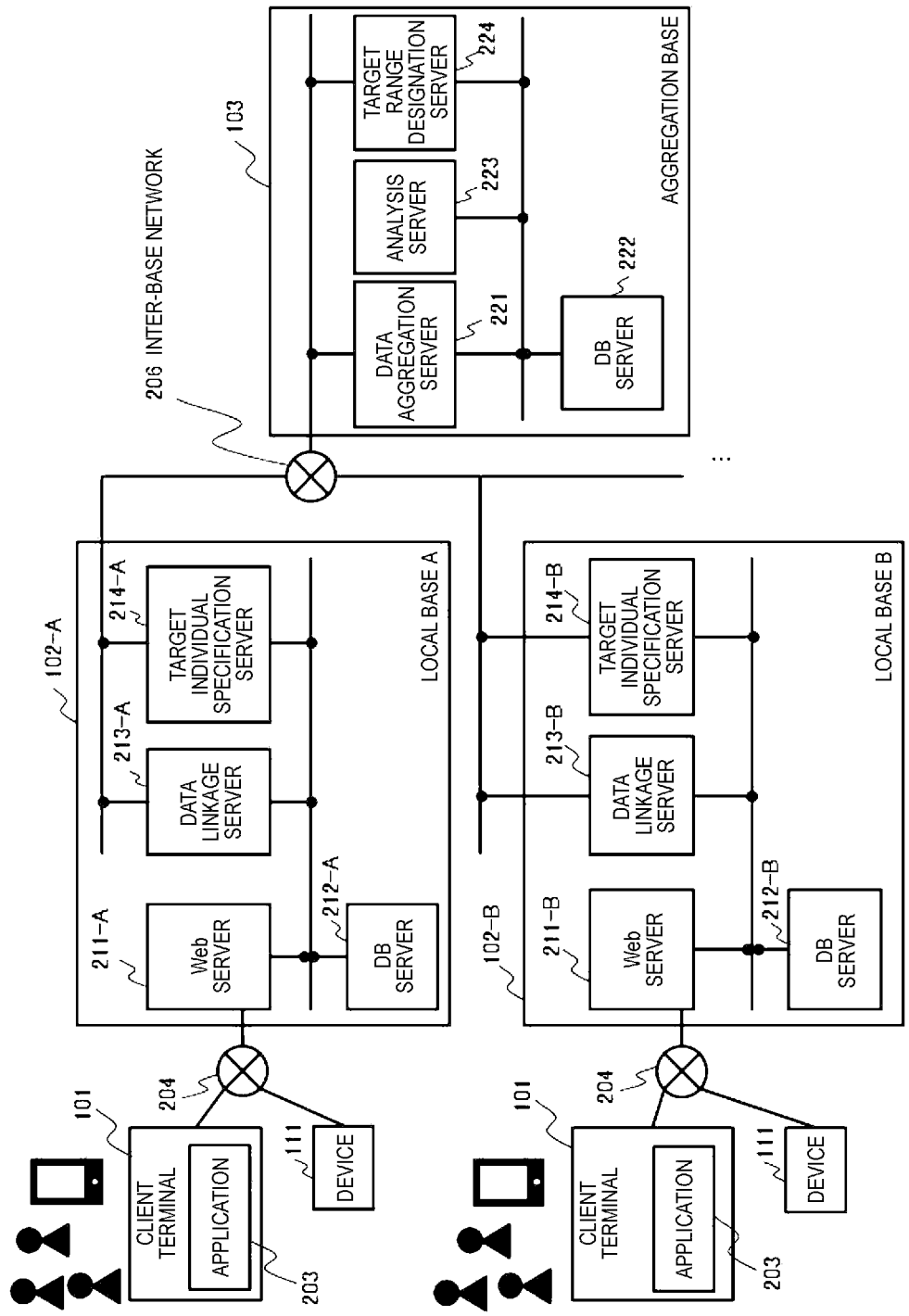
[FIG. 2]

[FIG. 3]
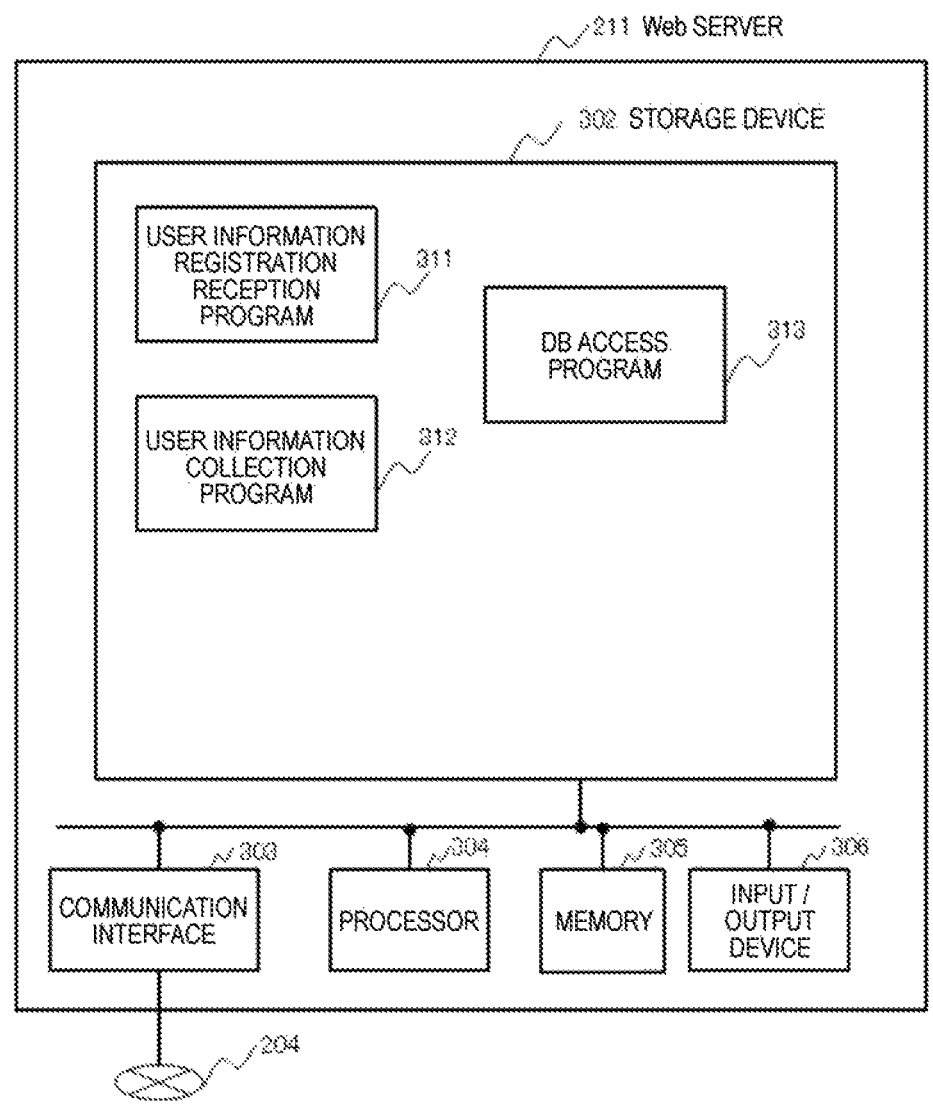

[FIG. 4]
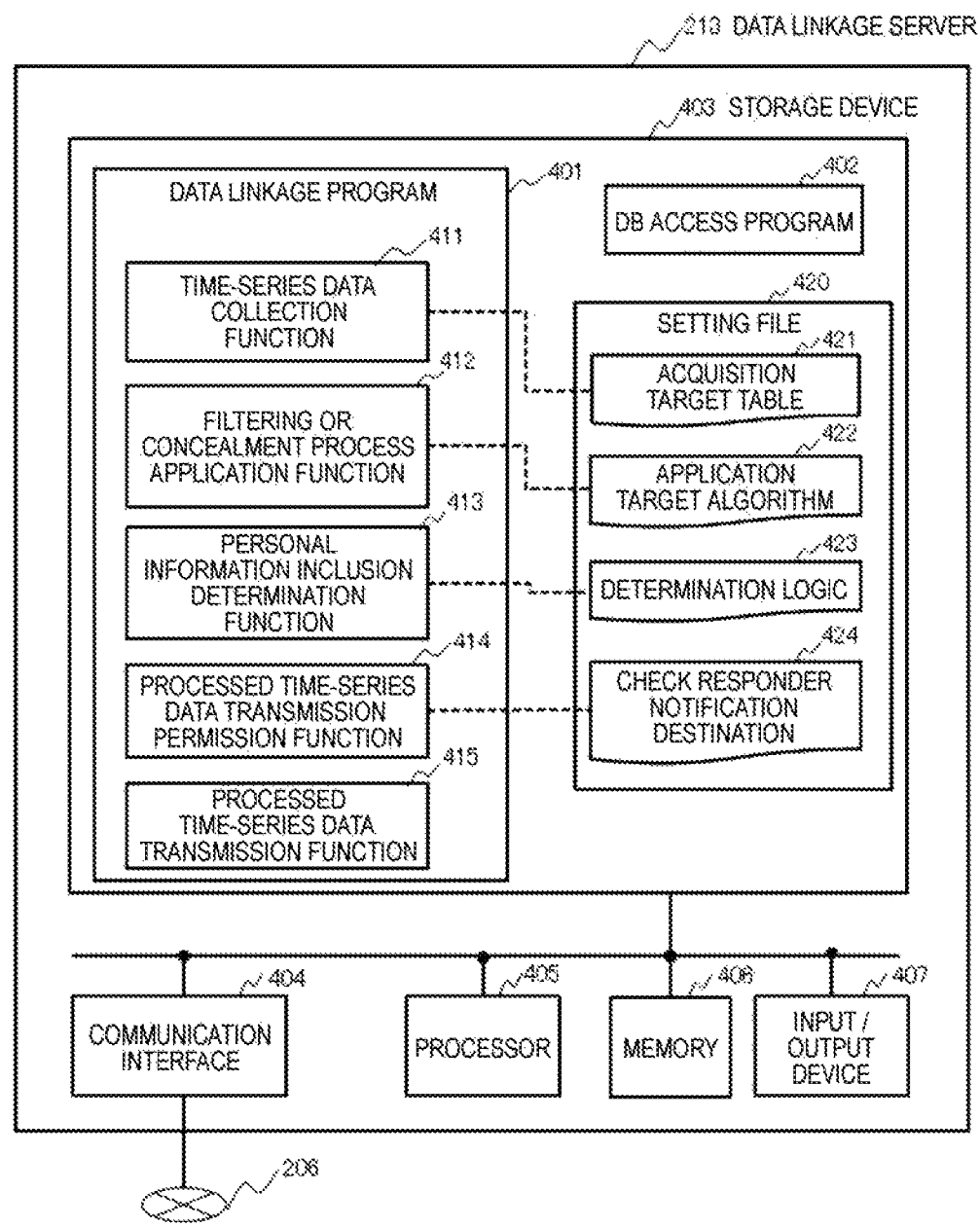

[FIG. 5]
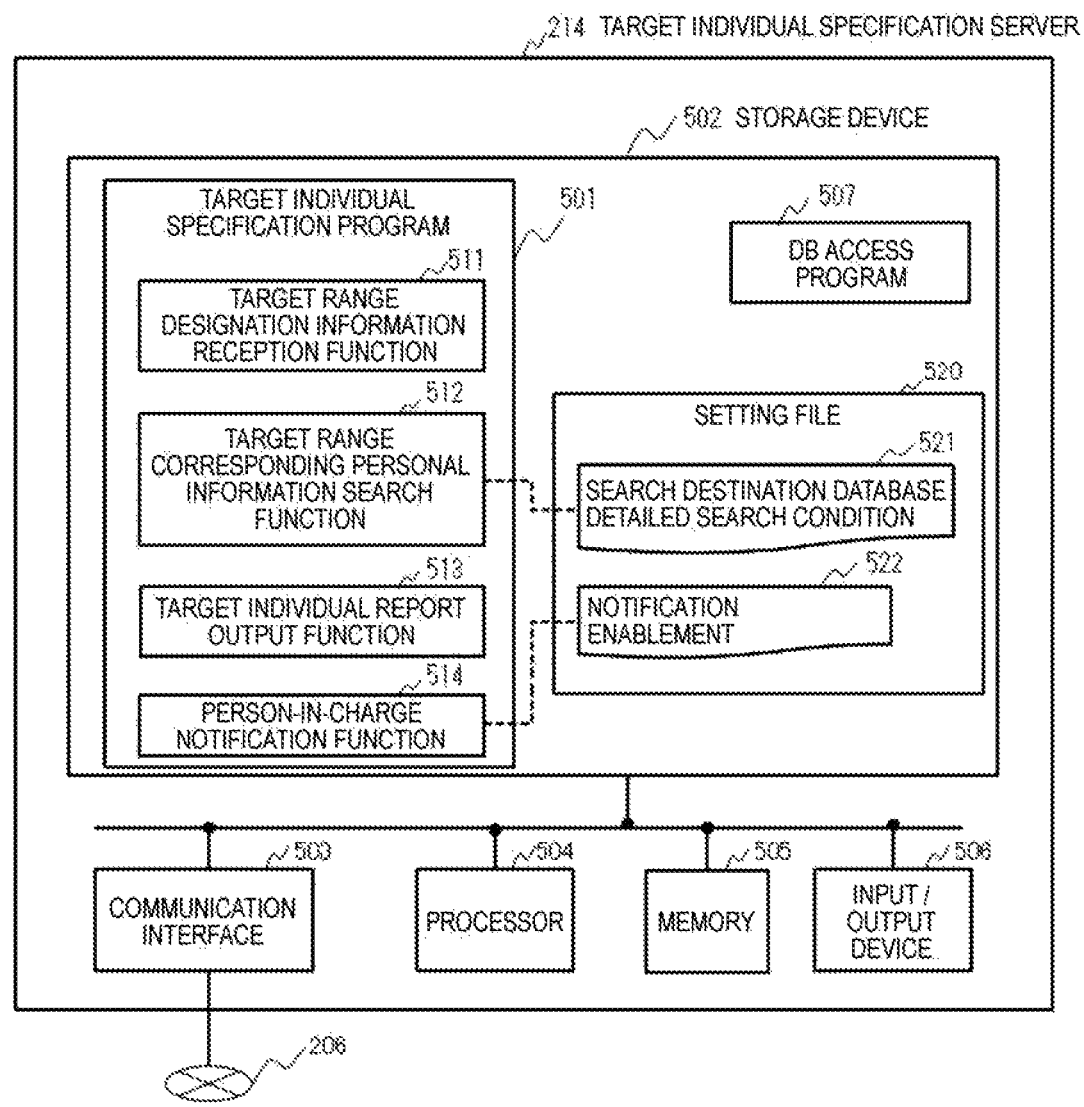

[FIG. 6]
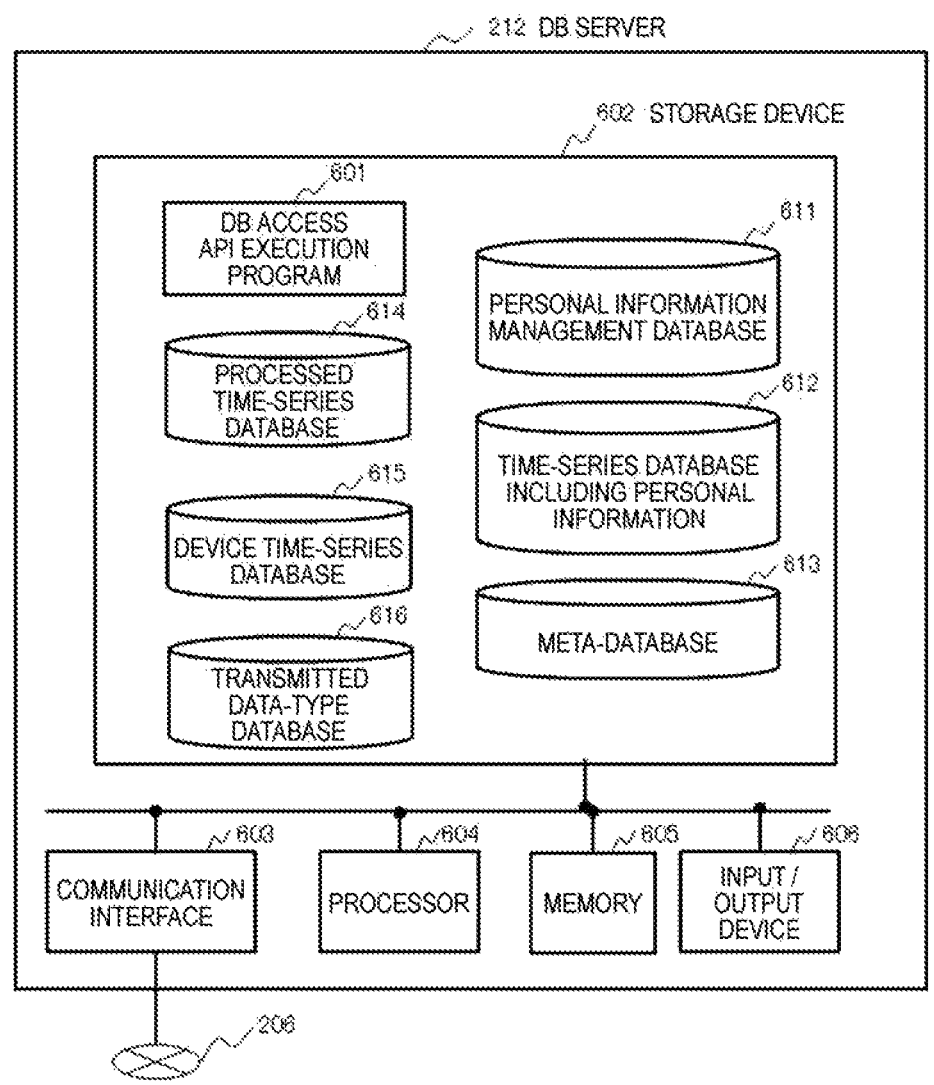

[FIG. 7]
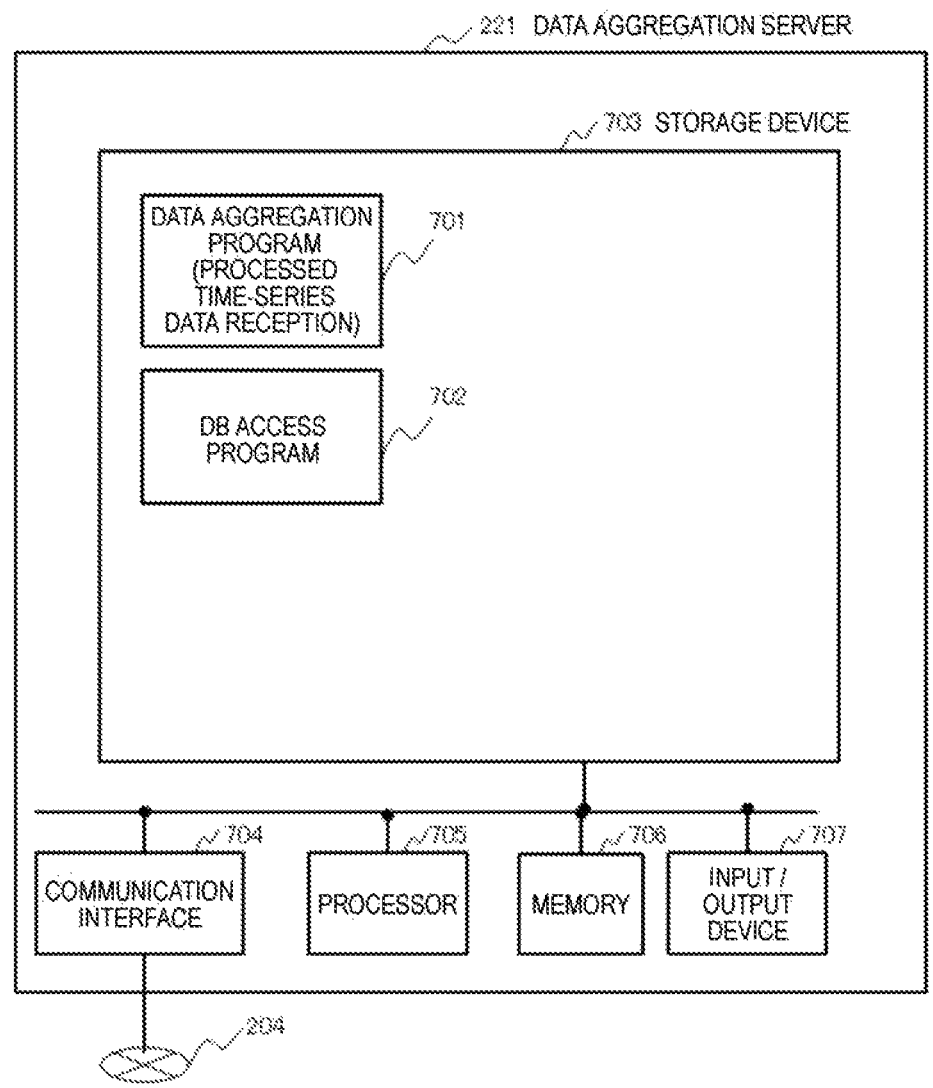

[FIG. 8]
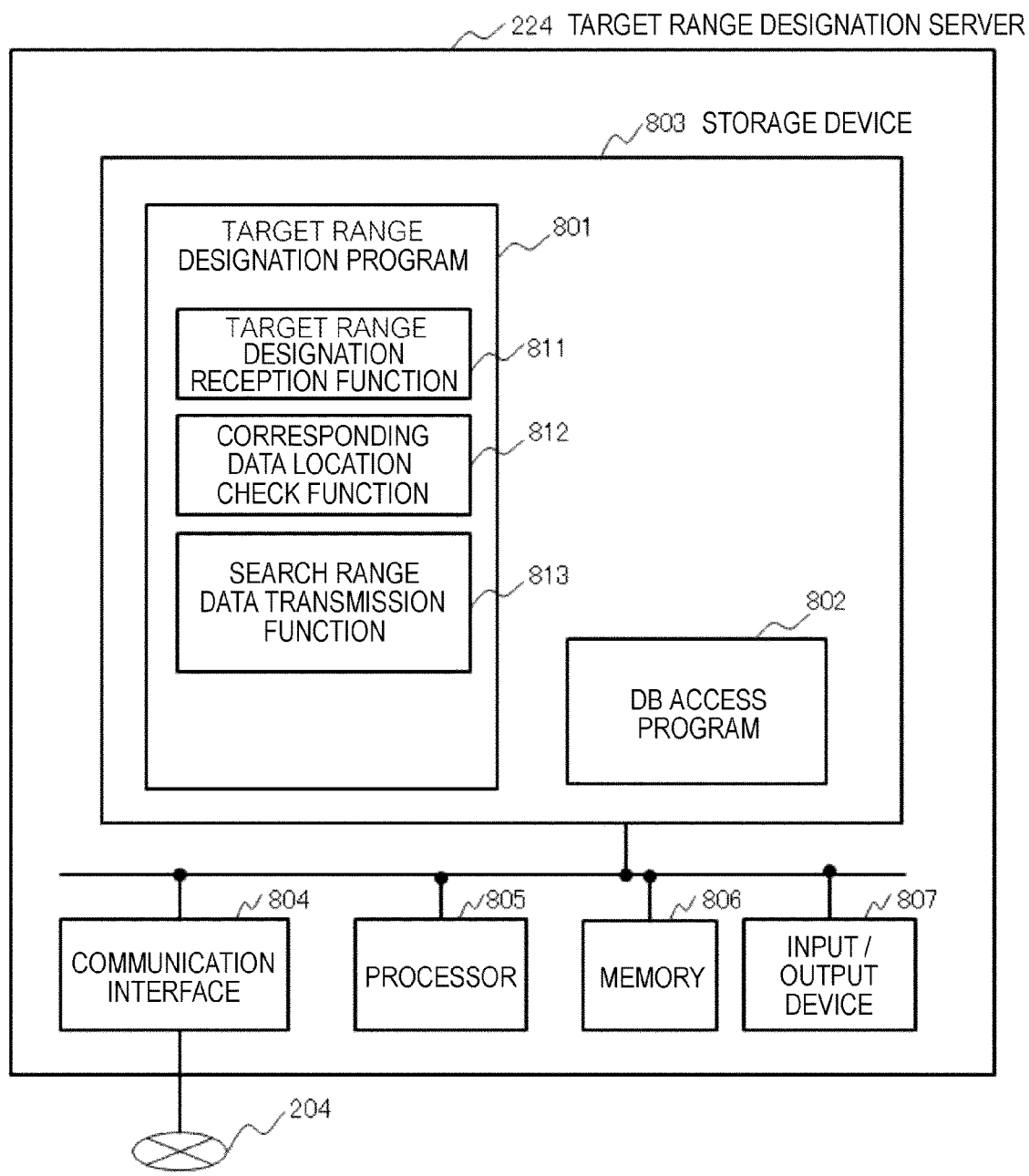

[FIG. 9]
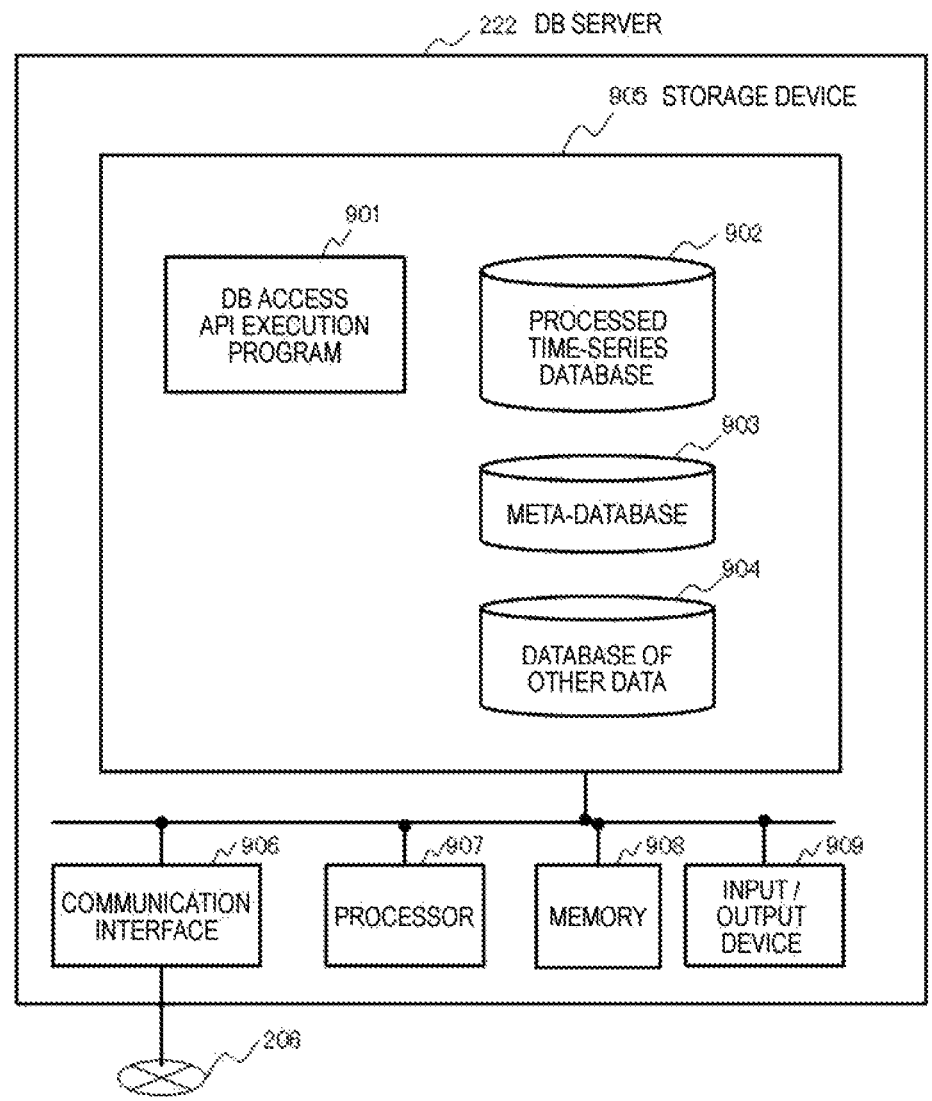

[FIG. 10]
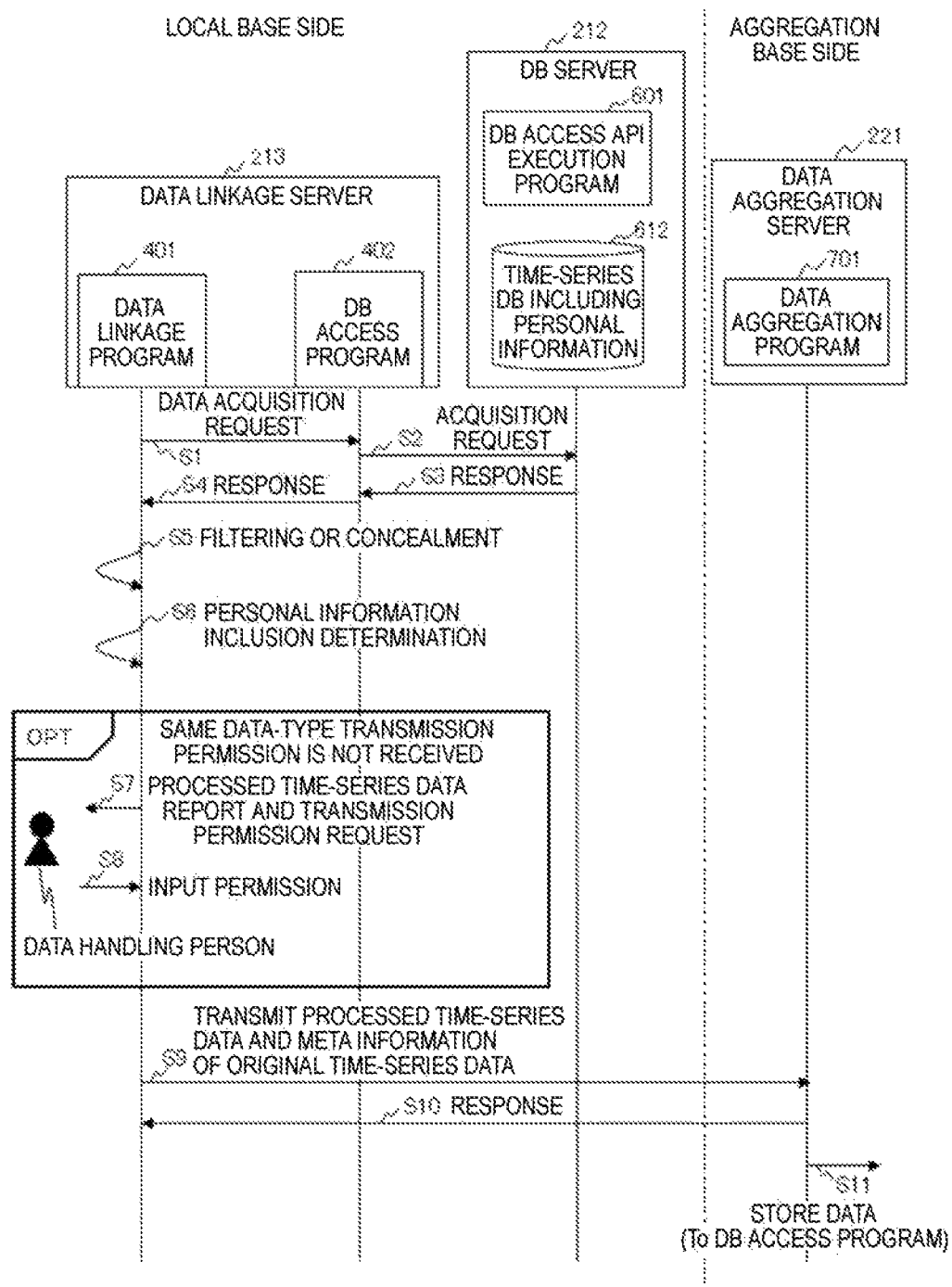
SEQUENCE WHEN DATA LINKAGE FROM LOCAL BASE TO AGGREGATION BASE

[FIG. 11]
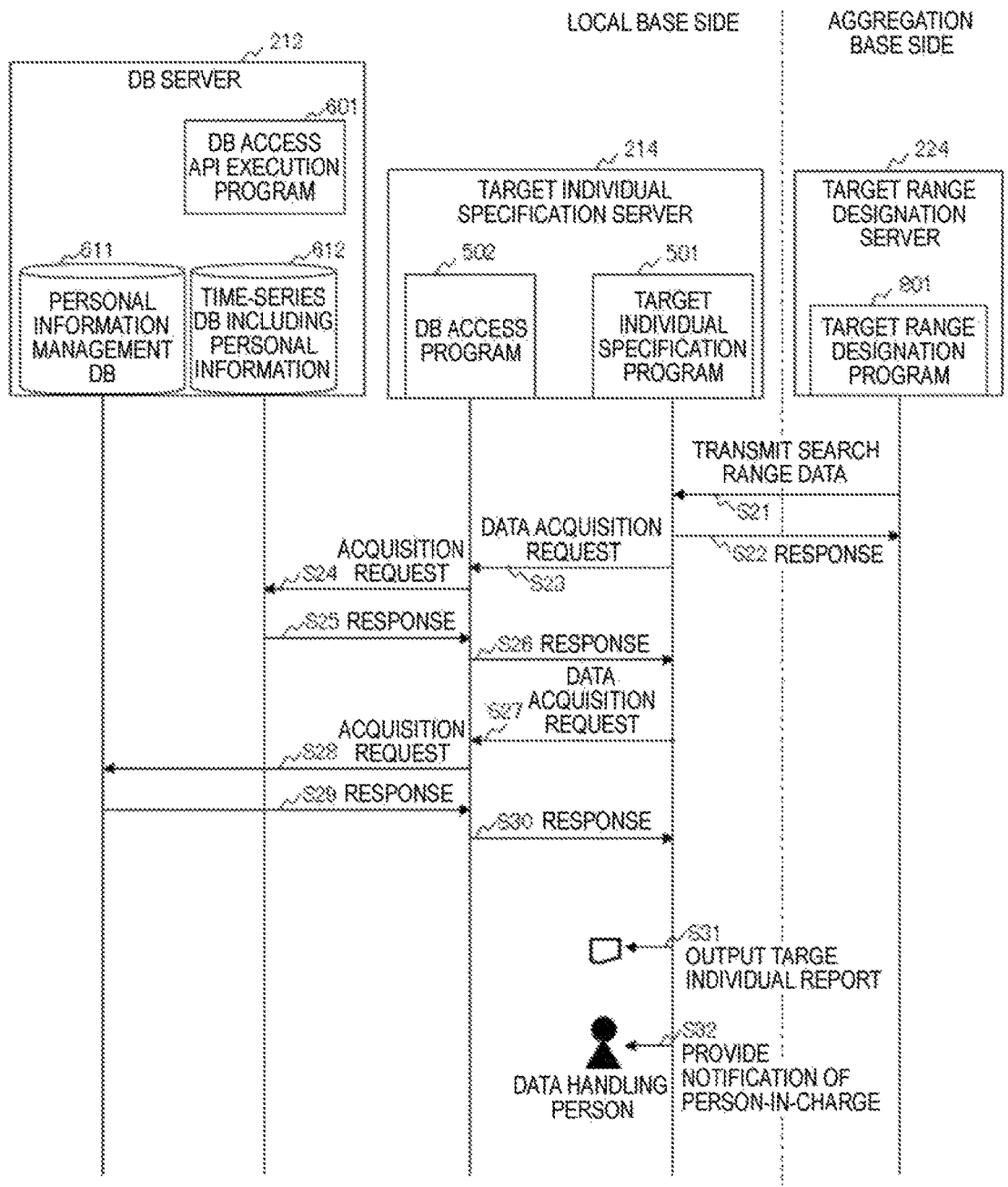
SEQUENCE OF INDIVIDUAL SPECIFICATION REQUEST FROM AGGREGATION BASE TO LOCAL BASE

[FIG. 12]
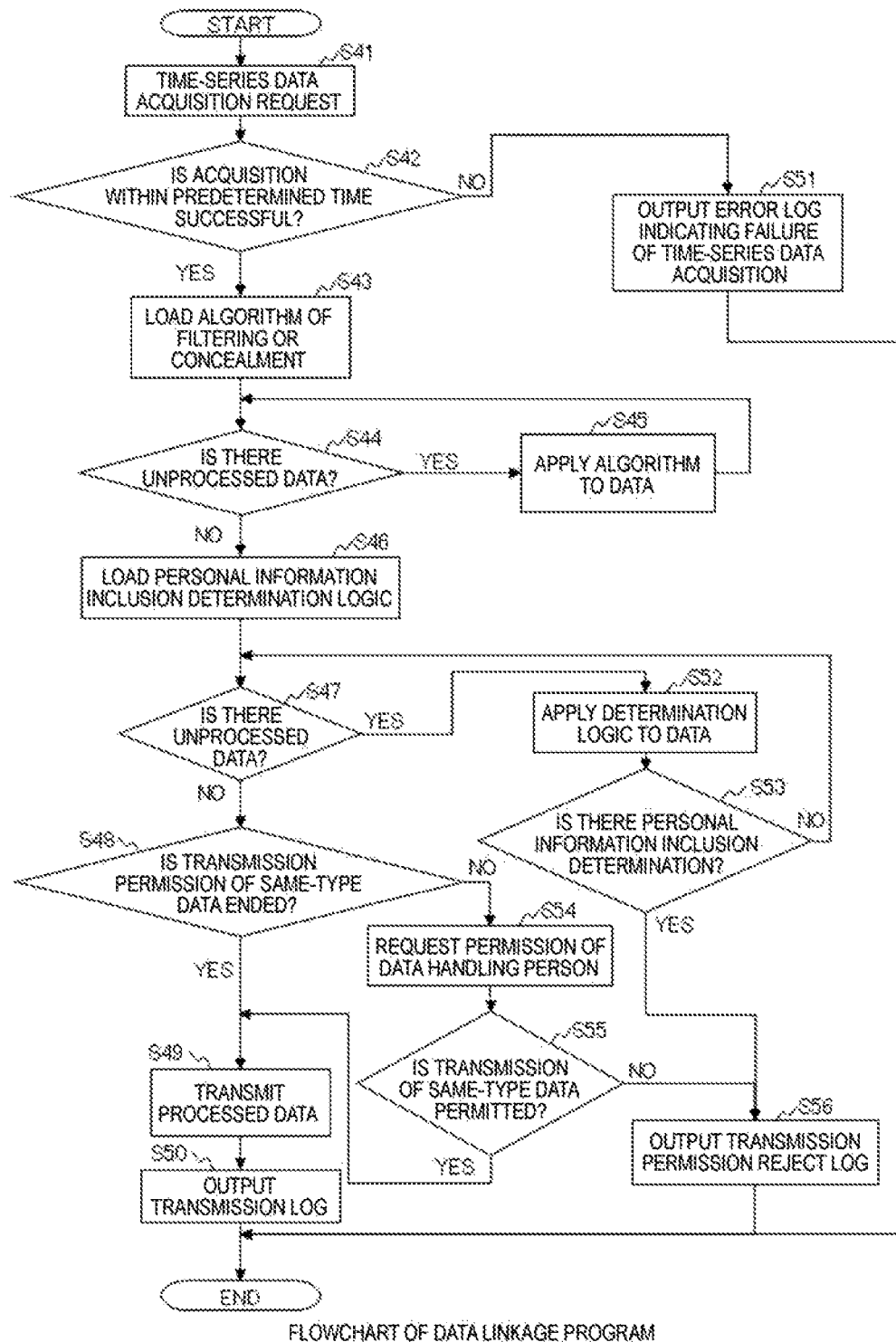
FLOWCHART OF DATA LINKAGE PROGRAM

[FIG. 13]
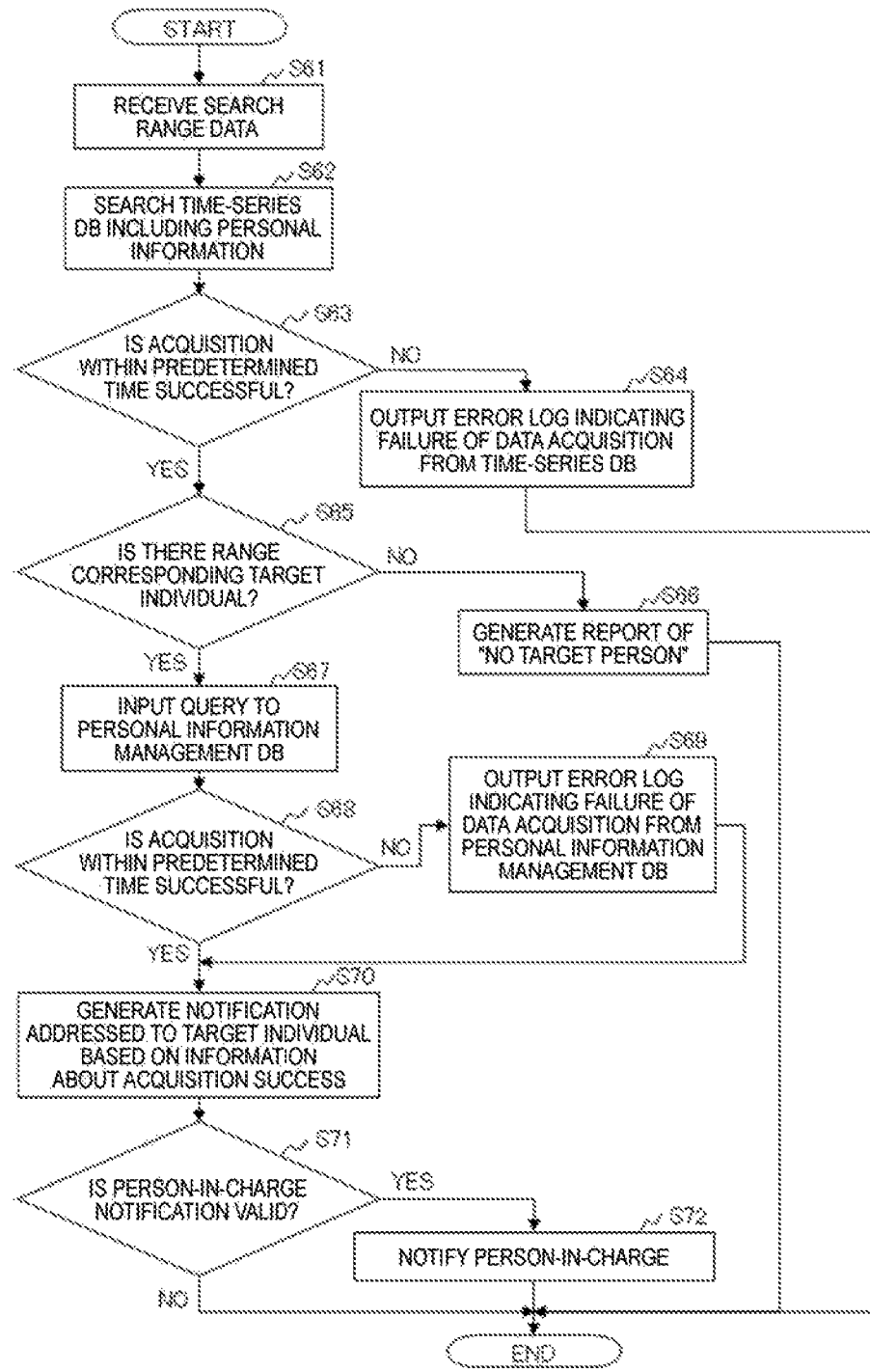
FLOWCHART OF TARGET INDIVIDUAL SPECIFICATION PROGRAM

[FIG. 14]
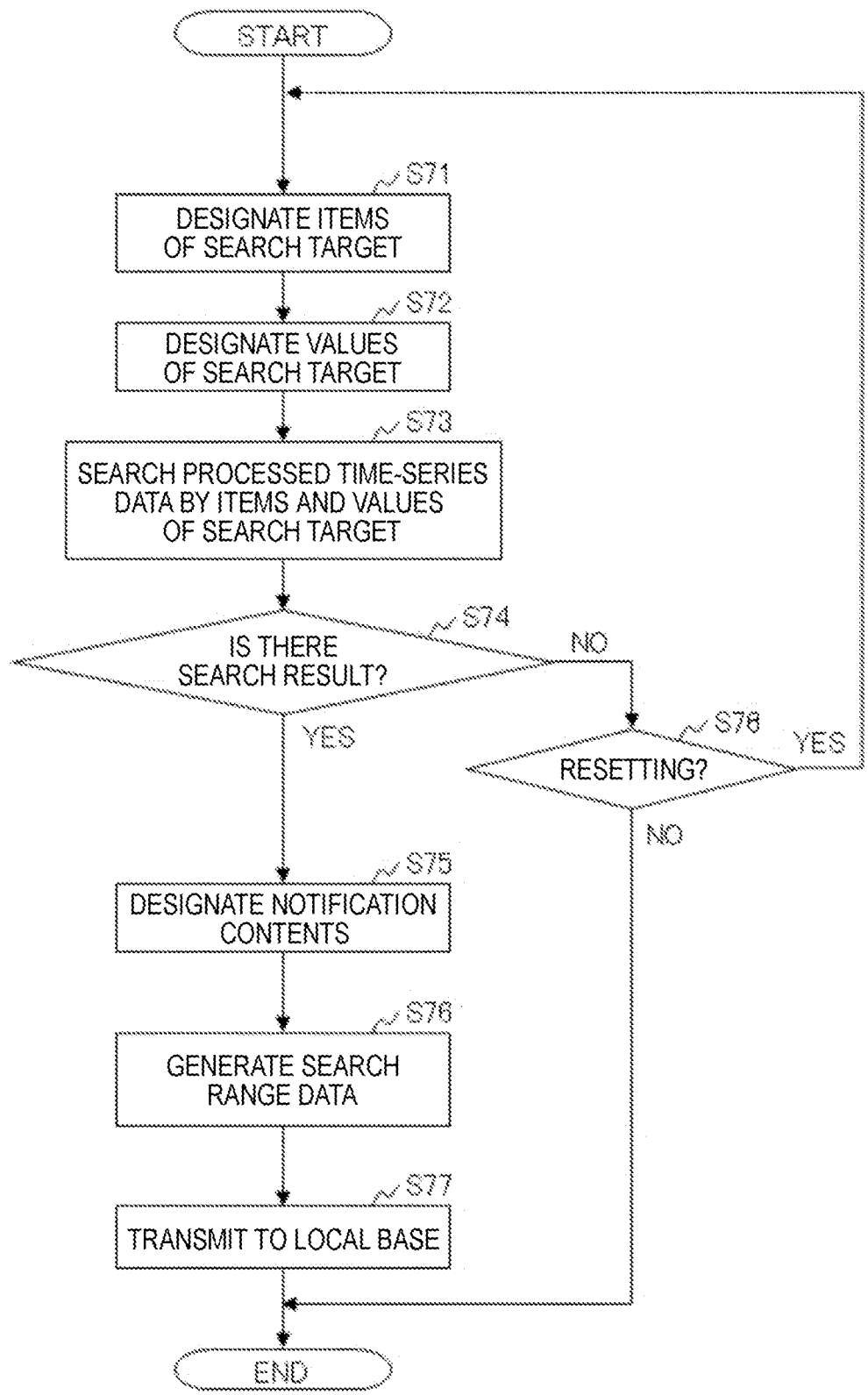
FLOWCHART OF TARGET INDIVIDUAL SPECIFICATION PROGRAM

[FIG. 15A]

6120 TIME-SERIES DATA INCLUDING PERSONAL INFORMATION

```
{
    "manID" : "0001",       ~6121
    "time" : "1592487249",  ~6122
    "data" :
    {
        "time" : "1592487249",     ~6123
        "machineID" : "AS0001",    ~6124
        "operation" : "change parts P"  ~6125
    }
}
```

[FIG. 15B]

6150 DEVICE TIME-SERIES DATA

```
{
    "machineID" : "AS0001",    ~6151
    "data" :
    {
        "time" : "1592487249",   ~6152
        "temperature" : "xxx",   ~6153
        "pressure" : "yyy", ...  ~6154
    }
}
```

[FIG. 15C]

6140 PROCESSED TIME-SERIES DATA

```
{
  "machineID" : "AS0001", /~6141
  "data" :
  {
    "time" : "1592497249", /~6142
    "machineID" : "AS0001", /~6143
    "operation" : "change parts P" /~6144
  }
}
```

[FIG. 15D]

6130 SEARCH RANGE DATA

```
{
  "machineID" : "AS0001", /~6131
  "notification" : "e-mail", /~6132
  "opMsg" : "Reboot", /~6133
  "dueDate" :
      "202006211200" /~6134
}
```

[FIG. 15E]

6110 PERSONAL INFORMATION MANAGEMENT TABLE

| manID | name | TEL | E-Mail |
|-------|------|------|--------|
| 0001 | Bob | 1234 | bob@... |
| 0002 | Alice | 5678 | alice@... |
| : | | | |

6111  6112  6113  6114

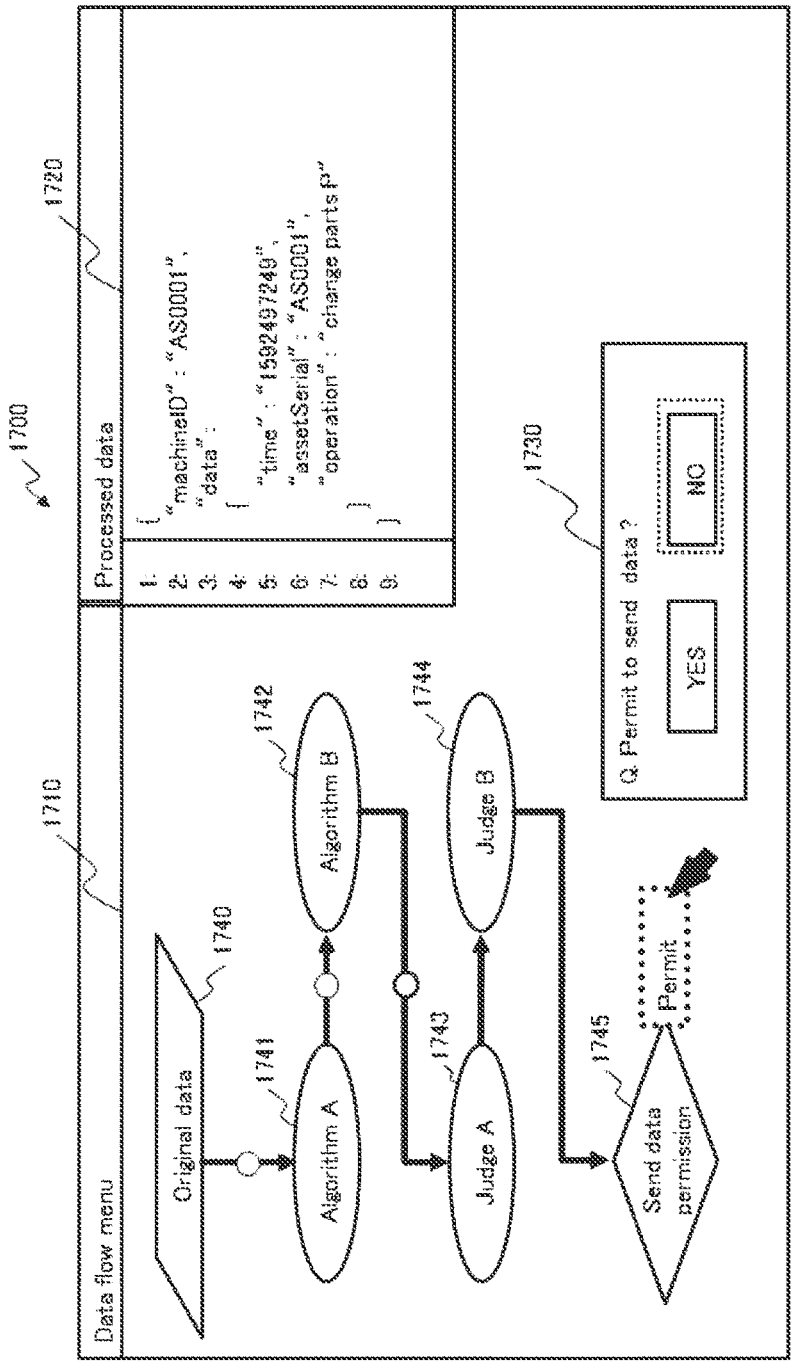
[FIG. 16]

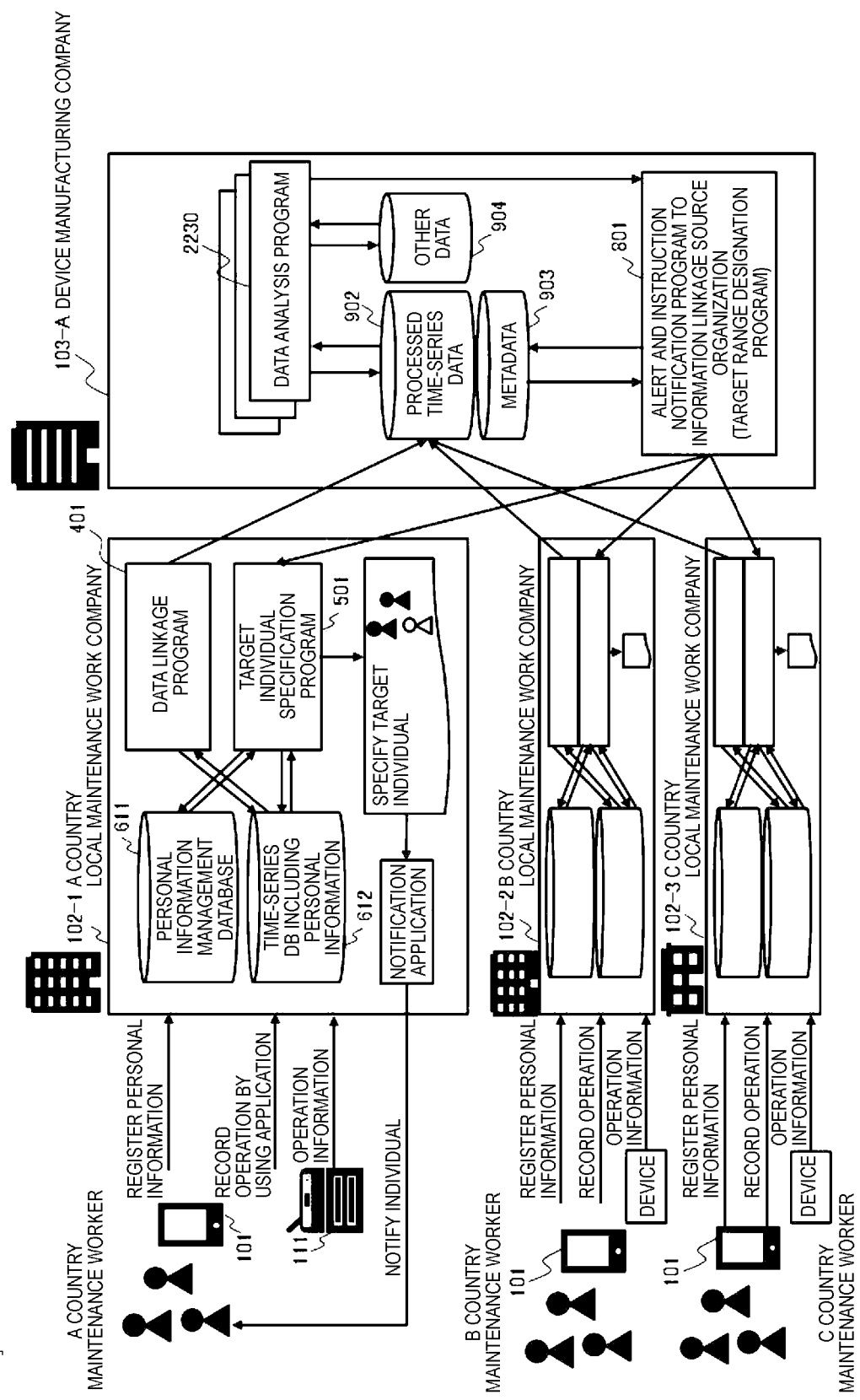
[FIG. 17]

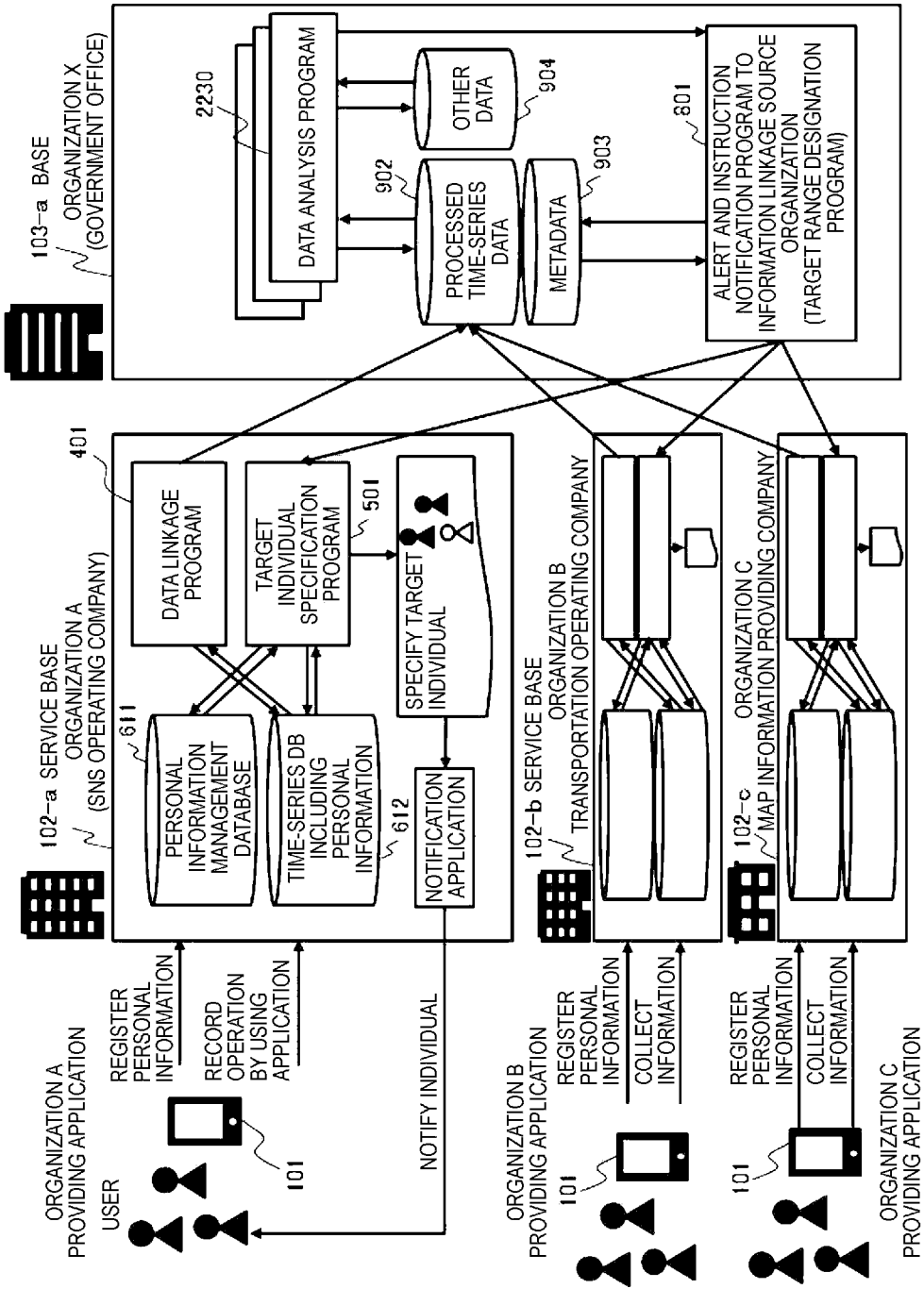
[FIG. 18]

INFORMATION PROCESSING SYSTEM, INFORMATION PROCESSING METHOD, AND COMPUTER

INCORPORATION BY REFERENCE

This application claims the priority of Japanese Patent Application No. 2020-190785 filed on Nov. 17, 2020, and the content thereof is incorporated into the present application by reference.

TECHNICAL FIELD

The present invention relates to a computer system for issuing instructions to individuals without cross-border transfer of personal information between a plurality of bases.

BACKGROUND ART

In recent years, with the spread of Internet of Things (IoT), services have been developed to collect operation data of various devices and apparatuses at an aggregation base and perform maintenance of the devices and apparatuses. Maintenance services using IoT are sometimes provided worldwide, and the countries or regions where the aggregation base that monitors devices and apparatuses and the device and apparatuses that are maintained are operating may be different. Further, maintenance services may be provided not only by the same company or organization but also by a plurality of companies or organizations in cooperation with each other.

On the other hand, in borderless cyberspace such as the Internet, in recent years, various countries and regions have enacted laws that restrict cross-border transfers of personal information, or the like (for example, General Data Protection Regulation (GDPR) in Europe, California Consumer Privacy Act (CCPA) in California, USA, and China's Cyber Security Law and Surveying Law).

Many of these restrictions limit the transfer of personal information. Further, under GDPR, or the like, it is obliged to clarify and explain the purpose of use to the subject, and to respond to requests for updating and deleting personal information. Further, in China, only companies licensed in China are permitted to handle location information such as GPS information.

In order to quickly and efficiently implement the above-described maintenance service using IoT, it is desirable that the aggregation base that monitors devices and apparatuses issues direct instructions to the maintenance staff at the local service base that performs the maintenance service.

However, in a case where the local service base that performs the maintenance service restricts the cross-border transfer of personal information, the aggregation base cannot acquire personal information such as the contact detail of the local maintenance staff, so that, it is difficult to issue direct instructions. Further, in a case where the company that operates the aggregation base is different from the company in charge of maintenance, when maintenance work data such as a person who installed the product includes personal information, it is difficult to acquire data from a local database.

As a background art in this technical field, there is disclosed in JP2009-237975A (PTL 1) as a technique for notifying an individual in an environment in which circulation of personal information is restricted. In PTL 1, an organization A stores personal information, and the organization A generates an anonymization number key for each piece of personal information. The organization A passes the anonymization number key to a central agency, so both obtain the anonymization number key. It is disclosed that, when the central agency wants to search for a corresponding person in an emergency or the like, the central agency causes the organization A to search for personal information using the anonymization number key and notifies the search results.

SUMMARY OF INVENTION

Technical Problem

In the above related art example, it is necessary for the organization A to pass an anonymization number key to the central agency in advance for each personal information, and when applying PTL 1 to maintenance services provided worldwide using IoT as described above, it becomes necessary to generate an anonymization number key for each maintenance staff, and store and manage a huge amount of anonymization information on the central agency side, so that there are problems with securing data storage capacity and maintaining reliability.

In particular, in a case where the companies or organizations that operate the aggregation base for monitoring IoT information and the local base for performing maintenance work are different, it may be difficult to generate an anonymization number key for each maintenance staff member at all local bases and distribute the key to the aggregation base.

Therefore, the present invention has been made in view of the above problems, and the purpose of the present invention is to notify individuals at local bases of alerts and instructions from an aggregation base, without cross-border transfer of personal information of local bases that perform maintenance work.

Solution to Problem

The present invention is an information processing system including: a first computer operating at a first base; a second computer operating at a second base; and a client terminal connected to the first computer, in which the first computer stores, as personal information of a user who uses the client terminal, personal management information including an identifier and a contact detail of the user, acquires operation information of the client terminal to generate personal time-series information in which the personal information of the user and time are added to the operation information, generates processed time-series information by performing predetermined concealment on the personal information in the personal time-series information, and transmits the processed time-series information to the second computer, the second computer receives the processed time-series information from the first computer, generates search range information from a search condition for the processed time-series information for specifying the user at the first base and a message to be transmitted to the user at the first base, and transmits the search range information to the first computer, and the first computer specifies the user by searching for the personal time-series information including the personal information, with the search condition of the search range information, when the search range information is received from the second computer.

Advantageous Effects of Invention

Therefore, according to the present invention, without the first base (local base) transferring personal information across the border to the second base (aggregation base) side, the first computer at the local base can specify the user (individual) who provides the personal information with the search conditions received from the aggregation base, and transmit a message or instruction.

The details of at least one implementation of the subject matter disclosed in the present specification are set forth in the accompanying drawings and the description below. Other features, aspects, and advantages of the disclosed subject matter will become apparent from the following disclosure, drawings, and claims.

BRIEF DESCRIPTION OF DRAWINGS

FIG. 1 is a block diagram showing Embodiment 1 of the present invention and showing an outline of a maintenance service system.

FIG. 2 is a block diagram showing Embodiment 1 of the present invention and showing an example of the configuration of the maintenance service system.

FIG. 3 is a block diagram showing Embodiment 1 of the present invention and showing an example of the configuration of a Web server at a local base.

FIG. 4 is a block diagram showing Embodiment 1 of the present invention and showing an example of the configuration of a data linkage server at the local base.

FIG. 5 is a block diagram showing Embodiment 1 of the present invention and showing an example of the configuration of a target individual specification server at the local base.

FIG. 6 is a block diagram showing Embodiment 1 of the present invention and showing an example of the configuration of a database server at the local base.

FIG. 7 is a block diagram showing Embodiment 1 of the present invention and showing an example of the configuration of a data aggregation server at an aggregation base.

FIG. 8 is a block diagram showing Embodiment 1 of the present invention and showing an example of the configuration of a target range designation server at the aggregation base.

FIG. 9 is a block diagram showing Embodiment 1 of the present invention and showing an example of the configuration of a database server at the aggregation base.

FIG. 10 is a sequence diagram showing Embodiment 1 of the present invention and showing an example of a data linkage process performed in the maintenance service system.

FIG. 11 is a sequence diagram showing Embodiment 1 of the present invention and showing an example of an individual specification request process performed in the maintenance service system.

FIG. 12 is a flowchart showing Embodiment 1 of the present invention and showing an example of a data linkage process performed at the local base.

FIG. 13 is a flowchart showing Embodiment 1 of the present invention and showing an example of a target individual specification process performed at the local base.

FIG. 14 is a flowchart showing Embodiment 1 of the present invention and showing an example of a target range designation process performed at the aggregation base.

FIG. 15A is a diagram showing Embodiment 1 of the present invention and showing an example of time-series data including personal information of the local base.

FIG. 15B is a diagram showing Embodiment 1 of the present invention and showing an example of time-series data of a device of the local base.

FIG. 15C is a diagram showing Embodiment 1 of the present invention and showing an example of processed time-series data of the local base.

FIG. 15D is a diagram showing Embodiment 1 of the present invention and showing an example of search range data of the aggregation base.

FIG. 15E is a diagram showing Embodiment 1 of the present invention and showing an example of a personal information management table of the local base.

FIG. 16 is a diagram showing Embodiment 1 of the present invention and showing an example of a management screen of the local base.

FIG. 17 is a block diagram showing Embodiment 2 of the present invention and showing an outline of a maintenance service system.

FIG. 18 is a block diagram showing Embodiment 3 of the present invention and showing an outline of a notification service system.

DESCRIPTION OF EMBODIMENTS

Embodiments of the present invention will be described below with reference to the accompanying drawings.

Embodiment 1

FIG. 1 is a block diagram showing Embodiment 1 of the present invention and showing an outline of a maintenance service system (or information processing system). The maintenance service system includes a local base A (102-A) to a local base C (102-C) that perform maintenance of devices 111 in different countries and regions, and an aggregation base 103 that collects information regarding each base and issues messages such as alerts or notifications regarding the maintenance of the devices 111.

In addition, when the local bases A (102-A) to C (102-C) are not specified individually, the symbol "102" omitting the "-" and the subsequent characters is used. The same applies to the symbols of other constituent elements. Further, an example in which cross-border transfer of personal information is prohibited between each local base 102 and the aggregation base 103 is shown.

A maintenance worker who performs maintenance of the device 111 belongs to each local base 102, and the maintenance worker uses a client terminal 101 to perform registration of personal information and report (work information) of maintenance work to the local base 102 to which the maintenance worker belongs. The local base 102 is an information processing system or a computer system in which one or more computers operate.

The personal information of the maintenance worker is stored in a personal information management database 611 of the local base A (102-A). Since the configuration of the local base B (102-B) and the local base C (102-C) is the same as the configuration of the local base A (102-A), the local base A (102-A) will be explained below.

The maintenance worker uses the application of the client terminal 101 to output a report (work information) on work such as maintenance work. The local base 102 collects work information from the client terminal 101 and registers the work information in a time-series database (DB in the figure, hereinafter the same) 612 including personal information.

The time-series database 612 including personal information includes personal information such as the identifier of the maintenance worker and the identifier of the device 111 for which the maintenance work is performed, as will be described later. At the local base 102, the data linkage program 401 generates processed time-series data by performing a process on personal information from the time-series database 612 including personal information at a predetermined timing, and transmits the generated data to the aggregation base 103.

It should be noted that, as the processing of personal information performed by the data linkage program 401, a processing algorithm that conforms to the restrictions of laws and regulations of the local base 102, such as filtering and concealment (anonymization) of personal information is applied. Further, the timing at which the local base 102 transmits the processed time-series data is a time that is set in advance in the maintenance service system, such as an acquisition request from the aggregation base 103 or a predetermined period.

The aggregation base 103 stores the processed time-series data received from each local base 102 in the processed time-series database 902, and stores the operation information of the device 111 collected from each local base 102 in a database 904 of other data.

At the aggregation base 103, the data analysis program 2230 monitors the operation information in the database 904 of other data, and when detecting an abnormality, a sign of an abnormality, or a time to replace a part or the like, the data analysis program 2230 notifies the output device of the device 111 that requires maintenance.

The administrator or the like of the aggregation base 103 uses the target range designation program 801 to generate search range data and requests each local base 102 to specify a maintenance worker and to provide a notification of the maintenance content, in order to notify the client terminal 101 of the maintenance worker in charge of the device 111 requiring maintenance of a message such as an alert and maintenance content.

Since personal information is not included (or is concealed) in the processed time-series database 902 of the local base 102, the aggregation base 103 can specify the device 111 to be maintained, but cannot specify the maintenance worker in charge. Therefore, the target range designation program 801 generates search range data obtained by adding a message to be notified to the maintenance worker to the search condition, with the identifier of the device 111 and the date and period when the work is performed as search conditions. The target range designation program 801 requests the local base 102 to specify the individual maintenance worker and to transmit a notification of the details of the maintenance.

At the local base 102 that has received the search range data, the target individual specification program 501 searches the time-series database 612 including personal information based on the search range data to specify the maintenance worker, acquires the contact detail registered in the personal information management database 611, and transmits the maintenance content to the client terminal 101.

As described above, in the maintenance service system of the present embodiment, time-series work information obtained by filtering or concealing personal information from the local base 102 is generated as processed time-series data and transmitted to the aggregation base 103, so that restrictions on cross-border transfer of personal information are avoided.

Then, the aggregation base 103 generates search range data in which search conditions related to individuals such as the identifier of the device 111 to be maintained and maintenance content (message) are designated, and requests the local base 102 to specify and notify the maintenance worker. It should be noted that the search conditions for specifying the maintenance worker at the local base 102 are not limited to the identifier of the device 111, but specification may be performed with the date and time when the work is performed, the content of the work, the number of the replaced part, or the like.

The aggregation base 103 cannot refer to personal information, but causes the target individual specification program 501 of the local base 102 to search the time-series database 612 including personal information to specify the maintenance worker responsible for maintaining the identifier of the device 111, thereby implementing quick maintenance services at the local base 102 and the aggregation base 103 belonging to different countries and regions, while eliminating the need for cross-border transfer of personal information.

<System Configuration>

FIG. 2 is a block diagram showing an example of the configuration of the maintenance service system. In the illustrated example, the aggregation base 103, the local base A (102-A), and the local base B (102-B) are connected by an inter-base network 206, and each local base 102, the client terminal 101, and the device 111 are connected by a network 204. Note that the network 204 is configured by the Internet, a wireless (or wired) network, or the like.

Since the local base A (102-A) and the local base B (102-B) have the same configuration, the local base A (102-A) will be described below. The local base 102 includes a Web server 211, a database server 212, a data linkage server 213, and a target individual specification server 214.

The Web server 211 receives the personal information of the maintenance worker from the client terminal 101 and registers it in the database server 212. Further, the Web server 211 receives the work information from the client terminal 101 and registers it in the database server 212. Further, the Web server 211 receives the operation information from the device 111 and registers it in the database server 212. Note that device 111 is a machine or apparatus including a sensor and a communication apparatus (not shown).

The application 203 is operating on the client terminal 101, and an ID for identifying the individual maintenance worker and a time stamp are added to the work information input by the maintenance worker, and the work information is transmitted to the local base 102. The local base 102 to which the maintenance worker belongs accumulates the received work information in the database server 212 as time-series data including personal information. Note that the addition of the ID for identifying the individual maintenance worker and the time stamp may be performed by the Web server 211 of the local base 102 or the like.

The database server 212 stores personal information of maintenance workers, time-series data including the personal information, time-series data of the device 111, and the like. The data linkage server 213 generates processed time-series data by performing a predetermined process on personal information from the time-series data including personal information, and transmits the generated data to the aggregation base 103.

Further, the data linkage server 213 transmits operation information of the device 111 to the aggregation base 103. Note that the timing at which the data linkage server 213 transmits the operation information is a preset condition such as a predetermined period and a request from the aggregation base 103.

The target individual specification server 214 searches the time-series database 612 including personal information based on the search range data received from the aggregation base 103 to specify the maintenance worker, and notifies the client terminal 101 of the maintenance content included in the search range data.

In the above example, an independent server is used for each function, but each function of the server may be implemented by one computer. In this case, any computer may be used as long as it includes a reception unit that receives personal information, work information, and operation information and registers the received information in a database, a data management unit that manages the data registered by the reception unit, a data linkage unit that processes personal information from work information (time-series data including personal information) to generate processed time-series data, and a target individual specification unit that receives search range data from the aggregation base 103, searches for time-series data including the personal information to specify a maintenance worker, and transmits a notification of maintenance contents.

The aggregation base 103 includes a data aggregation server 221, a database server 222, an analysis server 223, and a target range designation server 224.

The data aggregation server 221 receives the processed time-series data and the time-series data of the device 111 and stores the data in the database server 222. The database server 222 manages the processed time-series data and the time-series data of the device 111.

The analysis server 223 analyzes the time-series data of the device 111, specifies and outputs the identifier of the device 111 requiring maintenance and the maintenance content. Note that the maintenance content may be designated by the person in charge of the aggregation base 103 or the like.

The target individual specification server 214 generates search range data in which a search condition such as a search target period to the identifier of the specified device 111 and maintenance content (or message) is added, and transmits the search range data to the local base 102. Note that the target individual specification server 214 may broadcast the search range data to each local base 102, in a case where the local base 102 to which the device 111 whose identifier is specified belongs is unknown.

In the above example, an independent server is used for each function, but each function of the server may be implemented by one computer. In this case, any computer may be used as long as it includes a reception unit that receives the processed time-series data and the time-series data of the device 111 and registers the received data in a database, a data management unit that manages data registered by the reception unit, an analysis unit that specifies the identifier of the device 111 that requires maintenance from the time-series data of the device 111 and the content of the maintenance, and a target range specifying unit that generates search range data including search conditions such as the identifier of the device 111 and the maintenance content, and transmits the generated data to the local base 102.

<Web Server>

The configuration of each server will be described below. FIG. 3 is a block diagram showing an example of the configuration of the Web server 211 of the local base 102. The Web server 211 is a computer including a processor 304, a memory 305, a storage device 302, an input/output device 306, and a communication interface 303.

The storage device 302 is composed of a nonvolatile storage medium, and stores a user information registration reception program 311, a user information collection program 312, and a database access program 313. Each program is loaded into the memory 305 and then executed by the processor 304.

The user information registration reception program 311 receives the personal information of the maintenance worker from the client terminal 101 of the maintenance worker and registers the information in the database server 212. The user information collection program 312 receives work information input by the maintenance worker from the application 203 of the client terminal 101, and stores the information in the database server 212 as time-series data including personal information.

Further, the user information collection program 312 receives operation information from the device 111 and stores the information in the database server 212 as time-series data of the device 111. The database access program 313 receives access from the user information registration reception program 311 and the user information collection program 312 and executes access to the database server 212.

The input/output device 306 includes an input device such as a mouse, a keyboard, or a touch panel, and an output device such as a display or a speaker. The communication interface 303 is connected to the network 204 (or the inter-base network 206) to perform communication.

<Data Link Server>

FIG. 4 is a block diagram showing an example of the configuration of the data linkage server 213 of the local base 102. The data linkage server 213 is a computer including a processor 405, a memory 406, a storage device 403, an input/output device 407, and a communication interface 404.

The storage device 403 is composed of a non-volatile storage medium, and stores a data linkage program 401, a database access program 402, and a setting file 420. The data linkage program 401 and the database access program 402 are loaded into the memory 406 and then executed by the processor 405.

The data linkage program 401 includes a time-series data collection function 411, a filtering or concealment process application function 412, a personal information inclusion determination function 413, a processed time-series data transmission permission function 414, and a processed time-series data transmission function 415.

The processor 405 operates as a functional unit that provides a predetermined function by executing a process according to the program of each functional unit. For example, the processor 405 implements the time-series data collection function 411 by executing a process according to the time-series data collection program included in the data linkage program 401. The same applies to the other program. Further, the processor 405 also operates as a functional unit that provides functions of a plurality of processes executed by each program. Computers and computer systems are apparatuses and systems that include these functional units.

The data linkage program 401 performs a process by using various types of information preset in the setting file 420.

The time-series data collection function 411 reads time-series data including personal information set in an acquisition target table 421 of the setting file 420. The filtering or concealment process application function 412 uses an application target algorithm 422 of the setting file 420 to filter or conceal the personal information of time-series data including the personal information. As the application target algorithm 422, an algorithm that conforms to restrictions such as laws and regulations of the country or region to which the local base 102 belongs can be appropriately set.

Further, the application target algorithm 422 can be appropriately changed according to revisions of laws and regulations.

The personal information inclusion determination function 413 determines whether the personal information is included in the processed time-series data obtained by performing filtering or concealment using a determination logic 423 of the setting file 420. The determination logic 423 can be changed as appropriate according to changes in time-series data including personal information.

In a case where the format or data type of the processed time-series data generated by the data linkage program 401 is a first-appearing data type that has not been transmitted yet, the processed time-series data transmission permission function 414 inquires the data handling person designated in a check responder notification destination 424 of the setting file 420 whether or not transmission of the processed time-series data is permitted. Note that the processed time-series data transmission permission function 414 detects a data type that is not registered in a transmitted data-type database 616, which will be described later, as the first-appearing data type.

The processed time-series data transmission function 415 transmits to the aggregation base 103 the processed time-series data whose transmission is permitted by the data handling person.

Upon receiving a database access request from the data linkage program 401, the database access program 402 accesses the database server 212.

The input/output device 407 includes an input device such as a mouse, a keyboard, or a touch panel, and an output device such as a display or a speaker. The communication interface 404 is connected to the network 204 (or the inter-base network 206) to perform communication.

<Target Individual Specification Server>

FIG. 5 is a block diagram showing an example of the configuration of the target individual specification server 214 of the local base 102. The target individual specification server 214 is a computer that includes a processor 504, a memory 505, a storage device 502, an input/output device 506, and a communication interface 503.

The storage device 502 is composed of a non-volatile storage medium, and stores a target individual specification program 501, a database access program 507, and a setting file 520. The target individual specification program 501 and the database access program 507 are loaded into the memory 505 and then executed by the processor 504.

The target individual specification program 501 includes a target range designation information reception function 511, a target range corresponding personal information search function 512, a target individual report output function 513, and a person-in-charge notification function 514.

The processor 504 operates as a functional unit that provides a predetermined function by executing a process according to the program of each functional unit. For example, the processor 504 implements the target range corresponding personal information search function 512 by executing a process according to the target range applicable personal information search program included in the target individual specification program 501. The same applies to the other program. Further, the processor 504 also operates as a functional unit that provides functions of a plurality of processes executed by each program. Computers and computer systems are apparatuses and systems that include these functional units.

The target individual specification program 501 performs a process by using various types of information preset in the setting file 520. For the various types of information, information on databases to be searched, detailed conditions for searching, and the like are set.

The target range designation information reception function 511 receives the search range data received from the aggregation base 103 and passes the received data to the target range corresponding personal information search function 512. The target range corresponding personal information search function 512 searches for data corresponding to the search range data, from the time-series database including the personal information designated in the search destination database (and detailed search conditions) 521 of the setting file 520.

When acquiring the search result included in the search range data in the time-series database including personal information, the target range corresponding personal information search function 512 acquires the personal information to acquire the contact detail of the corresponding maintenance worker from the personal information management database.

The target individual report output function 513 generates and outputs a notification, alert, or report for the maintenance worker specified in the personal information management database. The person-in-charge notification function 514 refers to the notification enablement 522 of the setting file 520 to determine whether notification is permitted to the maintenance worker. If permitted, a notification generated by the target individual report output function 513 or the like is transmitted to the corresponding client terminal 101. Further, the person-in-charge notification function 514 notifies the administrator or the like of the local base 102 that the specification of a maintenance worker and a notification (or alert) of the maintenance content has been performed.

The input/output device 506 includes an input device such as a mouse, a keyboard, or a touch panel, and an output device such as a display or a speaker. The communication interface 503 is connected to the network 204 (or the inter-base network 206) to perform communication.

As described above, the target individual specification server 214 can search the time-series data including the personal information corresponding to the search range data transmitted from the aggregation base 103 to specify the maintenance worker, acquire the contact detail of the maintenance worker from the personal information management data, and notify the client terminal 101 of the contents instructed by the aggregation base 103.

<Database Server>

FIG. 6 is a block diagram showing an example of the configuration of the database server 212 of the local base 102. The database server 212 is a computer including a processor 604, a memory 605, a storage device 602, an input/output device 606, and a communication interface 603.

The storage device 602 is composed of a non-volatile storage medium, and stores a database access API execution program 601, the personal information management database 611, a time-series database 612 including personal information, a meta-database 613, a processed time-series database 614, a device time-series database 615, and transmitted data-type database 616.

The database access API execution program 601 is loaded into the memory 605 and then executed by the processor 604 to receive access from other servers.

The personal information management database 611 stores personal information of maintenance workers belonging to the local base 102. FIG. 15E is a diagram showing an example of the personal information management table 6110 stored in the personal information management database 611.

The personal information management table 6110 includes manID 6111 for storing the identifier of the maintenance worker, a name 6112 for storing a name, a TEL 6113 for storing a phone number, and an E-Mail 6114 for storing the mail address in one record.

The time-series database 612 including personal information is time-series data obtained by adding the identifier of the maintenance worker and time stamp to work information collected by the Web server 211 from the client terminal 101. FIG. 15A is a diagram showing an example of time-series data 6120 including personal information stored in the time-series database 612 including personal information.

In the time-series data 6120 including personal information, one piece of data is composed of manID 6121 storing the identifier of the maintenance worker, times 6122 and 6123 storing time stamps, machineID 6124 storing the identifier of the device 111, and operation 6125 storing work contents.

The example of FIG. 15A shows data in which the maintenance worker with manID 6121="0001" performs the replacement work of the part P that is the content of the operation 6125 on the device 111 with machineID 6124="AS0001" at time 6122="1592497249".

The meta-database 613 stores information and the like when the work information is acquired. The processed time-series database 614 stores processed time-series data 6140 in which personal information is processed by the data linkage server 213. FIG. 15C is a diagram showing an example of processed time-series data 6140 stored in the processed time-series database 614.

In the processed time-series data 6140, one piece of data is composed of machineIDs 6141 and 6143 storing identifiers of the device 111, time 6142 storing time stamps, and operation 6144 storing work contents.

The example of FIG. 15C shows data in which the replacement work of the part P that is the content of the operation 6144 is performed on the device 111 with machineID 6124="AS0001" at time 6142="1592497249". The illustrated example shows an example in which the data linkage server 213 filters manID 6121, which is personal information.

The device time-series database 615 is time-series data obtained by adding identifiers and time stamps to operation information collected from the device 111 by the Web server 211. FIG. 15B is a diagram showing an example of the device time-series data 6150 stored in the device time-series database 615.

In the device time-series data 6150, one piece of data is composed of machineID 6151 storing the identifier of the device 111, time 6152 storing the time stamp, temperature 6153 storing the temperature, and pressure 6154 storing the pressure.

The input/output device 606 includes an input device such as a mouse, a keyboard, or a touch panel, and an output device such as a display or a speaker. The communication interface 603 is connected to the inter-base network 206 to perform communication.

<Data Aggregation Server>

FIG. 7 is a block diagram showing an example of the configuration of the data aggregation server 221 of the aggregation base 103. The data aggregation server 221 is a computer including a processor 705, a memory 706, a storage device 703, an input/output device 707, and a communication interface 704.

The storage device 703 is composed of a non-volatile storage medium, and stores a data aggregation program 701 and a database access program 702.

The data aggregation program 701 and the database access program 702 are loaded into the memory 706 and then executed by the processor 705. The data aggregation program 701 registers the processed time-series data 6140 received from the local base 102 in the processed time-series database 902 of the database server 222. Further, the data aggregation program 701 registers the device time-series data 6150 received from the local base 102 in the database 904 of other data of the database server 222.

The database access program 702 accesses the database server 222, based on the access request from the data aggregation program 701.

The input/output device 707 includes an input device such as a mouse, a keyboard, or a touch panel, and an output device such as a display or a speaker. The communication interface 704 is connected to the network 204 (or the inter-base network 206) to perform communication.

<Target Range Designation Server>

FIG. 8 is a block diagram showing an example of the configuration of a target range designation server 224 of the aggregation base 103. The target range designation server 224 is a computer including a processor 805, a memory 806, a storage device 803, an input/output device 807, and a communication interface 804.

The storage device 803 is composed of a non-volatile storage medium, and stores a target range designation program 801 and a database access program 802. The target range designation program 801 and the database access program 802 are loaded into the memory 806 and then executed by the processor 805.

The target range designation program 801 includes a target range reception function 811, a corresponding data location check function 812, and a search range data transmission function 813.

The processor 805 operates as a functional unit that provides a predetermined function by executing a process according to the program of each functional unit. For example, the processor 805 implements the search range data transmission function 813 by executing a process according to a search range data transmission program included in the target range designation program 801. The same applies to the other program. Further, the processor 805 also operates as a functional unit that provides functions of a plurality of processes executed by each program. Computers and computer systems are apparatuses and systems that include these functional units.

The target range reception function 811 of the target range designation program 801 can receive search conditions for specifying a maintenance worker of the device 111 to be maintained and messages such as maintenance contents, from the input/output device 807. The corresponding data location check function 812 receives search conditions from the target range reception function 811, searches the processed time-series database 902 (FIG. 9), and determines whether or not there is data that matches the search condition to determine whether or not the search condition is valid.

When there is data matching the search conditions in the processed time-series database 902, the search range data transmission function 813 of the target range designation program 801 receives, from the input/output device 807, maintenance contents and messages for the maintenance worker, in addition to the received search conditions. Note that the maintenance content may be set by the analysis server 223 according to the analysis result of the analysis server 223.

Then, the search range data transmission function 813 transmits data obtained by adding a message to the search condition as search range data to the local base 102. In a case where the processed time-series database 902 does not include information on the local base A (102-A) and the local base B (102-B), the search range data transmission function 813 broadcasts the search range data to each local base 102. An example of the search range data 6130 is shown in FIG. 15D.

The search range data 6130 includes machineID 6131 that stores the identifier of the device 111, notification 6132 that stores the notification method, opMsg 6133 that stores the content of maintenance, and dueDate 6134 that stores the deadline.

In the illustrated example, the maintenance worker in charge of the device 111 with machineID 6131="AS0001" is instructed to perform the maintenance work with the maintenance contents "restart", and the deadline "12:00 on Jun. 21, 2020", via the notification method of "e-mail".

The database access program 802 receives an access request from the corresponding data location check function 812 and accesses the processed time-series database 902.

The input/output device 807 includes an input device such as a mouse, a keyboard, or a touch panel, and an output device such as a display or a speaker. The communication interface 804 is connected to the network 204 (or the inter-base network 206) to perform communication.

<Database Server>

FIG. 9 is a block diagram showing an example of the configuration of the database server 222 of the aggregation base 103. The database server 222 is a computer including a processor 907, a memory 908, a storage device 905, an input/output device 909, and a communication interface 906.

The storage device 905 is composed of a nonvolatile storage medium, and stores a database access API execution program 901, a processed time-series database 902, a meta-database 903, and a database 904 of other data.

The database access API execution program 901 is loaded into the memory 908 and then executed by the processor 907 to receive access from other servers.

The processed time-series database 902 is configured similarly to the processed time-series database 614 of the database server 212 of the local base 102, and stores the processed time-series data 6140 shown in FIG. 15C.

The meta-database 903 stores data required at the aggregation base 103. The database 904 of other data stores device time-series data 6150 or the like transmitted from the local base 102.

The input/output device 909 includes an input device such as a mouse, a keyboard, or a touch panel, and an output device such as a display or a speaker. The communication interface 906 is connected to the inter-base network 206 to perform communication.

The internal configuration of the analysis server 223 is not illustrated, and is configured in the same manner as each server described above to read the device time-series data 6150 from the database 904 of other data, analyze the operation information of the device 111 to extract the identifier of the device 111 requiring maintenance, and display the identifier on the output device of the input/output device. The analysis server 223 analyzes the device time-series data 6150 to detect an abnormality or a sign of an abnormality. It should be noted that the detection of an abnormality or a sign of an abnormality in the device 111 requiring maintenance may be performed by applying well-known or publicly known techniques, and will not be described in detail.

<Details of Process>

FIG. 10 is a sequence diagram showing an example of a data linkage process performed in the maintenance service system. This process is started by the data linkage program 401 of the local base 102 at a predetermined timing, and the processed time-series data 6140 is generated by performing a predetermined process on personal information from the time-series database 612 including personal information and transmitted to the aggregation base 103.

In the data linkage server 213, the data linkage program 401 requests the database access program 402 to acquire the time-series data 6120 including personal information (S1). As the range of data to be requested, a range designated by a data handling person (or administrator) or a range set in advance can be used.

The database access program 402 requests the database server 212 to transmit the time-series data 6120 including the designated range of personal information (S2). The database server 212 acquires the time-series data 6120 including personal information in the range requested from the time-series database 612 including personal information and responds to the database access program 402 (S3), and the database access program 402 responds to the data linkage program 401 with the access result (S4).

The data linkage program 401 uses the application target algorithm 422 that is set in advance to filter or conceal the personal information of the time-series data 6120 including the personal information and generate processed time-series data 6140 (S5). The data linkage program 401 uses preset determination logic 423 to proceed to the next step if personal information is not included in the processed time-series data 6140, and ends the process if personal information is included (S6).

In step S7, the data linkage program 401 extracts the data type of the processed time-series data 6140 that does not include personal information, and refers to the transmitted data-type database 616 to inquire the data handling person (or administrator) whether or not transmission is permitted via the input/output device 407, in a case where the data is of a type that is transmitted for the first time. The data type is determined based on, for example, the items (or fields) included in the processed time-series data 6140 and the format of the data.

When the data handling person permits transmission via the input/output device 407 (S8), the data linkage program 401 transmits the processed time-series data 6140 to the data aggregation server 221 of the aggregation base 103 (S9, S10).

The data aggregation server 221 stores the processed time-series data 6140 received by the data aggregation program 701 in the processed time-series database 902 of the database server 222 (S11).

Through the above process, the data linkage program 401 generates processed time-series data 6140 by performing a predetermined filtering or concealment process on the time-series data 6120 including personal information in the designated range, and transmits the generated data to the data aggregation server 221 of the aggregation base 103.

In the database server 222 of the aggregation base 103, the processed time-series data 6140 transmitted from each local base 102 is accumulated in the processed time-series database 902. Further, as described above, the operation information transmitted from the device 111 is also transmitted to the data aggregation server 221 of the aggregation base 103 at a predetermined timing, and stored as the device time-series data of the database server 222 in the database 904 of other data.

FIG. 11 is a sequence diagram showing an example of an individual specification request process performed in the maintenance service system. This process is executed in a case where the target individual specification server 214 of the local base 102 receives the search range data 6130 from the aggregation base 103.

The target range designation server 224 of the aggregation base 103 transmits the search range data 6130 to the target individual specification server 214 of the local base 102 (S21), and the target individual specification server 214 returns a response to the reception (S22).

The target individual specification program 501 of the target individual specification server 214 requests the database server 212 via the database access program 507 to transmit data (personal information) matching the search range data 6130 from the time-series database 612 including personal information (S23, S24).

The database server 212 responds to the target individual specification program 501 via the database access program 507 with personal information that matches the search range data 6130 (S25, S26). The search range data 6130 is, for example, the identifier (machineID 6151) of the device 111 and the work content (operation 6144) such as exchange of parts P, or the like, and the database server 212 outputs manID 6121, which is the identifier of the maintenance worker, as personal information matching this search condition.

The target individual specification program 501 inquires the personal information management database 611 of the database server 212 about the contact detail (for example, an e-mail address) via the database access program 507, with the identifier of the maintenance worker (manID 6121) acquired from the database server 212 as a search condition (S27, S28).

The database server 212 acquires the contact detail (E-Mail 6114) of the designated manID 6121 and responds to the target individual specification program 501 via the database access program 507 (S29, S30).

The target individual specification program 501 transmits the content of maintenance (opMsg 6133) and the deadline (dueDate 6134) included in the search range data 6130 as a message, to the acquired contact detail (S31). Further, the target individual specification program 501 reports to the data handling person at the corresponding local base 102 that the maintenance worker in charge of the device 111 has been notified.

Through the above process, the target individual specification server 214 specifies personal information (manID 6121) by searching the time-series database 612 including personal information with the identifier (machineID 6131) related to personal information included in the search range data 6130. Then, the target individual specification server 214 acquires the contact detail corresponding to the personal information from the personal information management database 611, and notifies the maintenance worker in charge of the device 111 of the maintenance content included in the search range data 6130.

FIG. 12 is a flowchart showing an example of a data linkage process performed at the local base. This process shows the details of the process executed by the data linkage server 213 in FIG. 10.

The data linkage program 401 of the data linkage server 213 requests data of the range designated as described above from the time-series database 612 including personal information of the database server 212 (S41).

The data linkage program 401 determines whether or not data could be acquired within a predetermined time from the time-series database 612 including personal information (S42). In a case where data could be acquired, the process proceeds to step S43, and in a case where data could not be acquired, the process proceeds to step S51. In step S51, the data linkage program 401 generates a log indicating that an error occurs to store the log in the storage device 403, and ends the process.

In step S43, with respect to the time-series data 6120 including personal information within a predetermined range acquired by the data linkage program 401, by using the application target algorithm 422 that is set in advance, the personal information of the time-series data 6120 including the personal information is filtered or concealed to generate processed time-series data 6140.

In step S44, for the time-series data 6120 including personal information acquired by the data linkage program 401, it is determined whether there is data that has not been filtered or concealed, the process proceeds to step S45, if there is unprocessed data, and the process proceeds to step S46, if filtering or concealment has been completed for all pieces of data.

In step S45, the data linkage program 401 filters or conceals the next data, and then returns to step S44 and repeats the above process. In step S46, the data linkage program 401 loads the preset determination logic 423.

In step S47, the data linkage program 401 determines whether or not the processed time-series data 6140 includes data that has not undergone a personal information verification process. The data linkage program 401 proceeds to step S52, if there is unprocessed data, and proceeds to step S48, if there is no unprocessed data.

In step S52, the data linkage program 401 verifies whether the processed time-series data 6140 includes personal information. In step S53, the data linkage program 401 determines whether personal information is included in the processed time-series data 6140, returns to step S47 and repeats the above process if personal information is not included, and proceeds to step S56 if personal information is included.

In step S48, since personal information is not included in the processed time-series data 6140, the data linkage program 401 extracts the data type of the processed time-series data 6140 that does not include personal information, and determines whether the data type has already been transmitted, with reference to the transmitted data-type database 616. If the data type has already been transmitted, the process proceeds to step S49. If the data type is the data type to be transmitted for the first time, the process proceeds to step S54.

In step S54, the data linkage program 401 inquires the data handling person (or administrator) whether or not transmission of the processed time-series data 6140 is permitted, via the input/output device 407 or the communication interface 404. In step S55, it is determined whether or not permission for transmission has been input from the input/output device 407 or the communication interface 404. If permitted, the process proceeds to step S49, and if denied, the process proceeds to step S56.

In step S49, the data linkage program 401 transmits the processed time-series data 6140 that does not include personal information to the aggregation base 103, and in step S50, the data linkage program 401 outputs a transmission log and ends the process.

In a case where personal information is included in the processed time-series data 6140 or in a case where the transmission is rejected, the data linkage program 401 outputs a log indicating that transmission is rejected and ends the process in step S56.

FIG. 13 is a flowchart showing an example of a target individual specification process performed at a local base. This process shows the details of the process executed by the target individual specification server 214 shown in FIG. 11.

Upon receiving the search range data 6130 from the target range designation server 224 of the aggregation base 103, the target individual specification server 214 of the local base 102 starts the process (S61).

The target individual specification program 501 of the target individual specification server 214 requests data (personal information) matching the search range data 6130 from the time-series database 612 including personal information from the database server 212 (S62).

The target individual specification program 501 determines whether or not data could be acquired within a predetermined time from the time-series database 612 including personal information (S63). In a case where data could be acquired, the process proceeds to step S65, and in a case where data could not be acquired, the process proceeds to step S64. In step S64, the target individual specification program 501 generates a log indicating that an error occurs when acquiring the time-series database 612 including personal information, stores the log in the storage device 502, and ends the process.

The target individual specification program 501 determines whether the response from the database server 212 includes personal information corresponding to the search range data 6130 (S65). In a case where the corresponding personal information is included, the process proceeds to step S67. In a case where there is no corresponding personal information, the process proceeds to step S66. In step S66, the target individual specification program 501 outputs a report indicating that there is no corresponding target person, and the process ends.

Next, the target individual specification program 501 inquires the personal information management database 611 about the contact detail corresponding to the personal information acquired from the database server 212 (S67). The target individual specification program 501 determines whether data could be acquired from the personal information management database 611 within a predetermined time (S68). In a case where data could be acquired, the process proceeds to step S70, and in a case where data could not be acquired, the process proceeds to step S69.

In step S69, the target individual specification program 501 generates a log indicating that an error occurs when acquiring data from the personal information management database 611, stores the log in the storage device 502, and proceeds to step S70.

In step S70, the target individual specification program 501 generates a notification to be transmitted to the contact detail acquired from the personal information management database 611. Note that if acquisition of the contact detail fails, a notification indicating that acquisition of the corresponding contact detail has failed is generated.

The target individual specification program 501 generates a notification addressed to the acquired contact detail, with the content of maintenance (opMsg 6133) and the deadline (dueDate 6134) included in the search range data 6130 as a message.

The target individual specification program 501 refers to the information of the notification enablement 522 of the setting file 520 to determine whether or not notification to the specified maintenance worker is valid (S71), proceeds to step S71 if the notification is valid, and ends the process if the notification is invalid.

The target individual specification program 501 transmits the generated notification to the maintenance worker whose contact detail has been specified (S72), and reports to the data handling person at the corresponding local base 102 that the maintenance worker in charge of the device 111 has been notified.

FIG. 14 is a flowchart showing an example of a target range designation process performed at the aggregation base 103. This process is started based on an input from the person-in-charge (or administrator) who operates the input/output device 807 at the target range designation server 224 of the aggregation base 103. Note that the person-in-charge of the target range designation server 224 acquires the identifier of the device 111 that needs maintenance from the analysis result of the analysis server 223.

The target range designation program 801 of the target range designation server 224 receives search target items from the input/output device 807 (S71). Items to be searched may be selected from the items of the processed time-series data 6140.

The target range designation program 801 receives the value or range of values of the search target item as a search condition (S72). The target range designation program 801 searches the processed time-series database 902 of the database server 222, with the search condition received in step S72.

Upon receiving the response from the database server 222, the target range designation program 801 determines whether there is a search result (processed time-series data 6140) that satisfies the search conditions (S74). The target range designation program 801 proceeds to step S75 when there is a search result, and proceeds to step S78 when there is no search result.

In step S78, the target range designation program 801 inquires via the input/output device 807 whether or not to reset the search condition, and returns to step S71 to repeat the process in the case of resetting, or ends the process if not.

In step S75, the target range designation program 801 receives, from the input/output device 807, a notification of a message (maintenance contents) to be transmitted to the maintenance worker who is specified at the local base 102 based on the search conditions. The content of the message can include, for example, the content of maintenance, the work deadline, or the like.

In step S76, the target range designation program 801 generates search range data 6130 from the received message with the search conditions, and transmits the search range data 6130 to the local base 102 in step S77.

With the above process, the target range designation server 224 verifies the search conditions required to specify the maintenance worker in the processed time-series database 902 that does not include personal information, and then generates the search range data 6130, thereby causing the local base 102 to specify individuals and transmit messages.

<Management Screen>

FIG. 16 is a diagram showing an example of a management screen 1700 of the local base 102. This management screen 1700 is a screen displayed on the display (output device) that constitutes the input/output device 407 of the data linkage server 213, and inquiring the data handling person whether or not transmission of the processed time-series data 6140 of the new data type is permitted. The management screen 1700 is output by the processed time-series data transmission permission function 414 of the data linkage program 401 (steps S54 and S55 in FIG. 12).

The management screen 1700 includes an area 1710 displaying the process of generating the processed time-series data 6140 by performing a predetermined process on the original data 1740 read from a time-series database 612 including personal information, an area 1720 displaying contents of the processed time-series data 6140, and a pop-up window 1730 for determining whether or not transmission of the processed time-series data 6140 is permitted.

The illustrated example shows that, with respect to the personal information of the original data 1740, through predetermined algorithm 1741 and algorithm 1742, the time-series data 6120 including personal information is filtered or concealed to generate the processed time-series data 6140. This process corresponds to step S45 in FIG. 12.

Through determination 1743 and determination 1744, a process 1745 of inquiring about transmission permission is performed on the processed time-series data 6140. The determination 1743 is, for example, determination as to the presence or absence of personal information in step S53 of FIG. 12, and the determination 1744 is determination as to the first-appearing data type in step S48 of FIG. 12.

In the pop-up window 1730, the data handling person or the like using the data linkage server 213 determines whether or not transmission of the data type of the processed time-series data 6140 displayed in the area 1720 is permitted.

By obtaining permission from the data handling person for the first-appearing data type, it is possible to check that the processed time-series data 6140 complies with the restrictions of the local base 102. Then, the permitted data type is registered in the transmitted data-type database of the database server 212, and subsequent transmission of the processed time-series data 6140 of the same data type is permitted.

As described above, in the maintenance service system of Embodiment 1, the aggregation base 103 collects the processed time-series data 6140 that does not include personal information and the time-series data of the device 111 from the plurality of local bases 102, and first specifies the device 111 to be maintained from the time-series data (904) of the device 111.

Next, the aggregation base 103 generates search range data 6130 including search conditions for specifying maintenance workers in charge of the device 111 to be maintained and instructions or messages, from the processed time-series data 6140 including the identifier of the device 111, and transmits the data to the local base 102. Note that in a case where the processed time-series data 6140 does not include information specifying the local bases 102, the aggregation base 103 broadcasts the search range data 6130 to the local base 102.

Upon receiving the search range data 6130, the local base 102 searches the time-series database 612 including personal information, with the search conditions of the search range data 6130 to specify the identifier (manID 6121) of the maintenance worker of the device 111. In a case where the search results of the time-series database 612 including personal information include the identifiers of the plurality of maintenance workers, the local base 102 can set, for example, the identifier of the maintenance worker in the latest data as the person in charge.

Then, the local base 102 acquires the contact detail corresponding to the identifier of the maintenance worker from the personal information management database 611, and transmits the instruction or message included in the search range data 6130 to the client terminal 101 of the maintenance worker.

In this way, the local base 102 of the maintenance service system can specify the maintenance worker who provides the personal information based on the search condition (6130) received from the aggregation base 103 without transferring the personal information across the border to the aggregation base 103 side, and communicate messages and instructions to the client terminal 101.

In Embodiment 1, an example is shown in which an individual identifier (manID 6121) is used as personal information stored in the time-series database 612 including personal information and the time-series data 6120 including personal information, but without being limited to this, any unique information that can specify an individual may be used.

Further, in Embodiment 1, an example is shown in which a telephone number (TEL 6113) and an e-mail address (E-Mail 6114) are used as a contact detail stored in the personal information management table 6110 of the personal information management database 611, but the present invention is not limited thereto. For example, any information by which a message can be transmitted to the client terminal 101 used by the maintenance worker, such as the identifier of a social network service (SNS), may be used.

Embodiment 2

FIG. 17 is a block diagram showing Embodiment 2 of the present invention and showing an outline of a maintenance service system. In the present embodiment, an example is shown in which in place of the aggregation base 103 of Embodiment 1, a base of a device manufacturing company (hereinafter, referred to as a company base) 103-A issues maintenance instructions to maintenance workers at bases of local maintenance work companies (hereinafter, referred to as local bases) 102-1 to 102-3 that maintain products of the company operated in respective countries (countries A to C). The configurations of the local base 102 and the company base 103-A are the same as in Embodiment 1.

As in Embodiment 1, the local base 102 in each country transmits the operation information (device time-series data) of the device 111 and the processed time-series data 6140 to the company base 103-A. The maintenance worker belonging to the local base 102 in each country registers the personal information in the personal information management database 611 in the same manner as in Embodiment 1.

In the present embodiment, it is allowed that the companies operating the local bases 102 in respective countries are not in the same group. That is, the items and forms of the time-series database 612 including personal information are not necessarily the same, and are assumed to be different for each local base 102.

Therefore, the items of the processed time-series data 6140 generated from the time-series database 612 including personal information at the local base 102 may differ between the local bases 102 in respective countries, but it is assumed that the identifier of the device 111 to be maintained is always included.

The company base 103-A specifies the identifier of the device 111 to be maintained from the device time-series data collected from each local base 102, generates search range data 6130 for specifying a maintenance worker from the device 111 with this identifier, and transmits the data to the local base 102.

The local base 102 in each country searches the time-series database 612 including personal information, with the search condition of the received search range data 6130, acquires personal information (manID) matching the search condition, and acquires the contact detail from the personal information management database 611.

Although the items of the time-series database 612 including personal information may differ depending on the local base 102 of each country, the search conditions for the search range data 6130 are generated from the processed time-series database 902 of each country.

Therefore, even when the items of the time-series database 612 including personal information differ between the local bases 102 in respective countries, the company base 103-A can generate the search range data 6130 regardless of the difference in the time-series database 612 including the personal information of the local bases 102 in respective countries.

As described above, even when the items of the time-series database 612 including personal information and the processed time-series data 6140 differ between the local bases 102, the company base 103-A can transmit instructions and messages to the maintenance workers at the local bases 102 in respective countries regardless of differences in items between the local bases 102.

Embodiment 3

FIG. 18 is a block diagram showing Embodiment 3 of the present invention and showing an outline of a notification service system. The present embodiment shows an example in which the content of the maintenance service system of Embodiment 1 is applied to a notification service system. The present embodiment shows an example of a service in which an organization X such as a government office notifies the users of organizations A to C that provide various services of alerts or the like.

The present embodiment shows an example in which an organization A provides Social Network Service (SNS) at a service base 102-a, an organization B provides transportation services by public transportation at a service base 102-b, and an organization C provides map information such as navigation at a service base 102-c. The configurations of the service bases 102-a to 102-c are the same as the local base 102 of Embodiment 1.

A user who uses the service at each service base 102 registers personal information in the personal information management database 611 of the service base 102 via the client terminal 101. In addition, a user in the present embodiment corresponds to the maintenance worker in Embodiment 1.

The service base 102 acquires operation information when using the service, generates time-series data 6120 including personal information, by adding an identifier for specifying the user to the operation information, and stores the data in the time-series database 612 including personal information. Note that user attribute information such as age, gender, and region of residence is included in the time-series database 612 including personal information.

The service base 102 generates processed time-series data 6140 from the time-series database 612 including personal information, and transmits the processed time-series data 6140 to the base X 103-a operated by the organization X. In addition, the processed time-series data 6140 is obtained by performing a predetermined concealment process on the attribute information of the time-series database 612 including personal information. As this concealment, for example, the service base 102 converts the age into an age group, and the region into a prefecture unit or the like. It should be noted that the attribute information can also be transmitted to the aggregation base 103 without being concealed.

The base X 103-a stores the processed time-series data 6140 received from each service base 102 in the processed time-series database 902.

The base X 103-a generates search range data 6130 by setting a search condition and a message (alert or notification) for the attribute information of the processed time-series database 902 when providing a notification of an alert or the like. As a search condition, for example, the region is X prefecture and the age group is 20-40 years old, and the message is, for example, countermeasures against infectious diseases. The base X (103-a) generates search range data 6130 specifying the user to be notified and transmits the data to each service base 102.

The service base 102 searches the time-series database 612 including personal information, with the search conditions of the received search range data 6130, acquires personal information (manID) that matches the search condition (attribute information), and acquires the contact detail from the personal information management database 611. The service base 102 can transmit a message to the client terminal 101 of the acquired contact detail.

In this way, in the present embodiment, an organization X such as a government office transmits search range data 6130 including the attribute information of the user to whom a message such as an alert is to be transmitted, to the service base 102 having a time-series database 612 including personal information.

The service base 102 can search the time-series database 612 including personal information from the personal information management database 611, with search conditions including attribute information to extract the personal information, and search the personal information management table 6110 with the extracted personal information to acquire the contact detail and transmit a message to the client terminal 101.

As described above, in the present embodiment, the service base 102 can specify the individual, with the search condition received from the base X (103-a) and transmit messages such as alerts and instructions, without transferring the personal information across the border to the base X (103-a) side.

Conclusion

As described above, the information processing system (maintenance service system, notification service system) of Embodiments 1 to 3 can be configured as follows.

(1) An information processing system including: a first computer (data linkage server 213, target individual specification server 214) operating at a first base (local base 102); a second computer (data aggregation server 221, analysis server 223, target range designation server 224) operating at a second base (aggregation base 103); and a client terminal (101) connected to the first computer, in which the first computer (213, 214) stores, as personal information of a user (maintenance worker) who uses the client terminal (101), personal management information (personal information management table 6110) including an identifier (manID 6111) and a contact detail (E-mail 6114) of the user, acquires operation information of the client terminal (101) to generate personal time-series information (time-series data including personal information 6120)

in which the personal information (6111) of the user and time are added to the operation information, generates processed time-series information (processed time-series data 6140) by performing predetermined concealment on the personal information (6121) of the personal time-series information (6120), and transmits the processed time-series information (6140) to the second computer, the second computer (221, 223, 224) receives the processed time-series information (6140) from the first computer, generates search range information (search range data 6130) from a search condition for the processed time-series information (6140) for specifying the user at the first base and a message to be transmitted to the user at the first base, and transmits the search range information (6130) to the first computer, and the first computer specifies the user by searching for the personal time-series information (6120) including the personal information (6121), with the search condition of the search range information (6130), when the search range information (6130) is received from the second computer.

With the above configuration, the local base 102 can specify the maintenance worker who provides the personal information, based on the search condition (6130) received from the aggregation base 103 without transferring the personal information across the border to the aggregation base 103 side.

(2) In the information processing system described in (1) above, the first computer acquires the personal information (6121) of the specified user from the personal time-series information (6120), acquires the contact detail of the user corresponding to the personal information (6121) from the personal management information (6110), and transmits the message included in the search range information (6130) to the contact detail.

With the above configuration, the local base 102 searches the personal information management table 6110 based on the specified personal information to acquire the contact detail, thereby transmitting a message to the client terminal 101 of the maintenance worker (user).

(3) In the information processing system described in (1) above, the first computer collects operation information of a device (111) operating at the first base and an identifier (machineID 6151) of the device (111), as device time-series information (device time-series data 6150), transmits the device time-series information to the second computer, generates processed time-series information (6140), by including an identifier (6121) of a user who performs maintenance of the device (111) and an identifier of a device (111) to be maintained, as the operation information of the client terminal (101), and concealing the identifier of the user as personal information (6121), the second computer analyzes the device time-series information (6150) received from the first computer to specify the identifier (6151) of the device (111) to be maintained, generates a search condition for searching for the identifier (6151) of the specified device (111) from the processed time-series information (6140) that does not include the personal information (6121), generates maintenance content of the device (111) to be maintained as a message (6133), and generates the search range information (6130) from the search condition and the message, and the first computer searches for the personal time-series information (6120) including the personal information (6121), with the search condition of the search range information (6130) received from the second computer to specify the user and device (111) to be maintained.

With the above configuration, the aggregation base 103 generates search range data 6130 including search conditions for specifying maintenance workers in charge of the device 111 to be maintained and instructions or messages, from the processed time-series data 6140 including the identifier of the device 111, and transmits the data to the local base 102. The local base 102 that receives the search range data 6130 can specify the identifier (manID 6121) of the maintenance worker of the device 111, with the search conditions of the search range data 6130 in the time-series database 612 including personal information.

(4) In the information processing system described in (3) above, the first computer acquires personal information (6121) by searching for personal time-series information (6120) including personal information (6121) based on search range information (6130) including the identifier (machineID 6151) of the device (111), acquires a contact detail from personal information management information (6110) based on the personal information (6121) that is a search result, and transmits a message included in the search range information (6130) to the contact detail (6114).

With the above configuration, the local base 102 acquires the contact detail corresponding to the identifier of the maintenance worker from the personal information management database 611, and transmits the instruction or message included in the search range data 6130 to the client terminal 101 of the maintenance worker.

(5) In the information processing system described in (2) above, the first computer generates the personal time-series information (6120) by including the attribute information of the user in addition to the identifier (6121) of the user, and generates processed time-series data by concealing the identifier of the user as personal information (6121), the second computer generates search range information (6130) by designating a target to which the message is to be transmitted with the attribute information, and the first computer searches for the personal time-series information (6120), with the search condition of the search range information (6130) including the attribute information to acquire personal information (6121), and specifies a user to which the message is to be transmitted.

With the above configuration, an organization X such as a government office transmits the attribute of a user to which a message such as an alert is to be transmitted as search range data 6130, to the service base 102 having a time-series database 612 including personal information, so that the service base 102 can acquire the contact detail from the personal information management database 611 and transmit a message to the client terminal 101 of a user having specific attribute information.

(6) In the information processing system described in (1) above, the first base (102) and the second base (103) belong to different countries or organizations, and the first computer makes an inquiry as to whether or not transmission is permitted, in a case where the processed time-series information to be transmitted (6140) is of a first-appearing data type.

With the above configuration, in a case where the processed time-series data 6140 is of a first-appearing data type, it is possible to check that the processed time-series data 6140 complies with the restrictions of the local base 102, by obtaining permission from the data handling person.

It should be noted that the present invention is not limited to each of the above-described embodiments, and various modifications are included. For example, the above-described embodiments have been described in detail in order to explain the present invention in an easy-to-understand manner and are not necessarily limited to those having all the configurations described. In addition, some of the configurations of certain embodiments may be replaced with the configuration of the other embodiments, and it is also possible to add configurations of other embodiments to the configurations of certain embodiments. Further, addition, deletion, or replacement of other configurations for a part of the configuration of each embodiment can be applied singly or in combination.

Further, each of the above-described configurations, functions, processing units, processing means, and the like may be partially or entirely realized by hardware, for example, by designing an integrated circuit. Further, each of the above configurations, functions, or the like may be implemented by software by a processor interpreting and executing a program for implementing each function. Information such as programs, tables, and files implementing each function can be stored in a recording device such as a memory, a hard disk, a solid state drive (SSD), or a recording medium such as an IC card, an SD card, and a DVD.

Further, the control lines and the information lines which are considered to be necessary for the explanation are indicated, and not all control lines and information lines are necessarily indicated on the product. In practice, it may be considered that almost all configurations are interconnected.

<Supplement>

The following are typical aspects of the present invention other than those described in the claims.

<16>

A non-temporary computer-readable storage medium storing a program for controlling a computer that includes a processor and a memory and operates at a first base, the program causing a computer to execute:
- a personal management information storing step of storing, as personal information of a user who uses a client terminal, personal management information including an identifier and a contact detail of the user;
- a personal time-series information generation step of acquiring operation information of the client terminal to generate personal time-series information in which the personal information of the user and time are added to the operation information;
- a processed time-series information transmission step of generating processed time-series information by performing predetermined concealment on the personal information in the personal time-series information, and transmitting the processed time-series information to the second computer;
- a search range information receiving step of receiving the search range information from the second computer; and
- a user specification step of searching the personal time-series information including the personal information, with the search condition of the search range information to specify the user.

The invention claimed is:

1. An information processing system comprising:
a first computer operating at a first base;
a second computer operating at a second base; and
a client terminal connected to the first computer, wherein
the first computer
   stores, as personal information of a user who uses the client terminal, personal management information including an identifier and a contact detail of the user,
   acquires operation information of the client terminal to generate personal time-series information in which the personal information of the user and time are added to the operation information,
   generates processed time-series information by performing predetermined concealment on the personal information in the personal time-series information, and
   transmits the processed time-series information to the second computer,
the second computer
   receives the processed time-series information from the first computer,
   generates search range information from a search condition for the processed time-series information for specifying the user at the first base and a message to be transmitted to the user at the first base, and
   transmits the search range information to the first computer, and
the first computer specifies the user by searching for the personal time-series information including the personal information, with the search condition of the search range information, when the search range information is received from the second computer.

2. The information processing system according to claim 1, wherein
the first computer
   acquires personal information of the specified user from the personal time-series information,
   acquires a contact detail of the user corresponding to the personal information from the personal management information, and
   transmits the message included in the search range information to the contact detail.

3. The information processing system according to claim 1, wherein
the first computer
   collects operation information of a device operating at the first base and an identifier of the device, as device time-series information,
   transmits the device time-series information to the second computer, and
   generates processed time-series information, by including an identifier of a user who performs maintenance of the device and an identifier of a device to be maintained, as the operation information of the client terminal, and concealing the identifier of the user as personal information,
the second computer
   analyzes the device time-series information received from the first computer to specify the identifier of the device to be maintained, generates a search condition for searching for the identifier of the specified device from the processed time-series information that does not include the personal information, and
   generates maintenance content of the device to be maintained as a message to generate the search range information from the search condition and the message, and
the first computer searches for the personal time-series information including the personal information, with the search condition of the search range information received from the second computer to specify the user and the device to be maintained.

4. The information processing system according to claim 3, wherein
the first computer acquires personal information by searching for personal time-series information including personal information with search range information including the identifier of the device, acquires a contact detail from personal information management information based on the personal information that is a search result, and transmits a message included in the search range information to the contact detail.

5. The information processing system according to claim 2, wherein
the first computer generates the personal time-series information by including attribute information of the user in addition to the identifier of the user, and generates processed time-series information by concealing the identifier of the user as personal information,
the second computer generates search range information by designating a target to which the message is to be transmitted with the attribute information, and
the first computer searches for the personal time-series information, with the search condition of the search range information including the attribute information to acquire personal information, and specifies a user to which the message is to be transmitted.

6. The information processing system according to claim 1, wherein
the first base and the second base belong to different countries or organizations, and
the first computer makes an inquiry as to whether or not transmission is permitted, in a case where the processed time-series information to be transmitted is of a first-appearing type.

7. An information processing method of transmitting a message by including a first computer operating at a first base, a second computer operating at a second base, and a client terminal connected to the first computer, the method comprising:
a personal management information storing step of, by the first computer, storing, as personal information of a user who uses the client terminal, personal management information including an identifier and a contact detail of the user;
a personal time-series information generation step of, by the first computer, acquiring operation information of the client terminal to generate personal time-series information in which the personal information of the user and time are added to the operation information;
a processed time-series information transmission step of, by the first computer, generating processed time-series information by performing predetermined concealment on the personal information in the personal time-series information, and transmitting the processed time-series information to the second computer;
a processed time-series information receiving step of, by the second computer, receiving the processed time-series information from the first computer;
a search range information transmission step of, by the second computer, generating search range information including a search condition for the processed time-series information for specifying the user at the first base and a message to be transmitted to the user at the first base, and transmitting the search range information to the first computer;
a search range information receiving step of, by the first computer, receiving the search range information from the second computer; and
a user specification step of, by the first computer, searching the personal time-series information including the personal information, with the search condition of the search range information to specify the user.

8. The information processing method according to claim 7, further comprising:
a personal information acquisition step of, by the first computer, acquiring the personal information of the specified user from the personal time-series information;
a contact detail acquisition step of, by the first computer, acquiring the contact detail of the user corresponding to the personal information from the personal management information; and
a message transmission step of, by the first computer, transmitting the message included in the search range information to the contact detail.

9. The information processing method according to claim 7, further comprising:
a device time-series information transmission step of, by the first computer, collecting operation information of device operating at the first base and an identifier of the device, as device time-series information to transmit the device time-series information to the second computer; and
a device time-series information analysis step of, by the second computer, analyzing the device time-series information received from the first computer to specify the identifier of the device to be maintained, wherein
in the personal time-series information generation step, personal time-series information is generated by including an identifier of a user who performs maintenance of the device and an identifier of the device to be maintained, as the operation information of the client terminal,
in the search range information transmission step, a search condition for searching for the identifier of the specified device is generated from the processed time-series information that does not include the personal information, maintenance content of the device to be maintained is generated as a message, and the search range information is generated from the search condition and the message, and
in the user specification step, the personal time-series information including the personal information is searched, with the search condition of the search range information received from the second computer to specify the user and the device to be maintained.

10. The information processing method according to claim 9, wherein
in the user specification step, personal information is acquired by searching for personal time-series information including personal information with search range information including the identifier of the device, a contact detail is acquired from personal information management information with the personal information that is a search result, and a message included in the search range information is transmitted to the contact detail.

11. The information processing method according to claim 8, wherein in the personal time-series information generation step, the personal time-series information is generated by including attribute information of the user in addition to the identifier of the user, in the processed time-series information transmission step, the identifier of the user is concealed as personal information to generate processed time-series information, in the search range information transmission step, search range information is generated by designating a target to which the message is to be transmitted with the attribute information, and in the user specification step, personal information is acquired by searching for the personal time-series information, with the search condition of the search range information including the attribute information to specify a user to which the message is to be transmitted.

12. The information processing method according to claim 7, wherein the first base and the second base belong to different countries or organizations, the information processing method further comprising:

a step of, by the first computer, making an inquiry as to whether or not transmission is permitted, in a case where the processed time-series information to be transmitted is of a first-appearing type.

13. A computer comprising a processor and a memory and operating at a first base, wherein the processor stores, as personal information of a user who uses the client terminal, personal management information including an identifier and a contact detail of the user, acquires operation information of the client terminal to generate personal time-series information in which the personal information of the user and time are added to the operation information, generates processed time-series information by performing predetermined concealment on the personal information in the personal time-series information, transmits the processed time-series information to the second computer, and searches for personal time-series information including the personal information, with the search condition of the search range information to specify the user, when the search range information is received from the second computer.

14. The computer according to claim 13, wherein the processor acquires the personal information of the specified user from the personal time-series information, acquires the contact detail of the user corresponding to the personal information from the personal management information, and transmits the message included in the search range information to the contact detail.

15. The computer according to claim 13, wherein the processor collects operation information of a device operating at the first base and an identifier of the device, as device time-series information, and transmits the device time-series information to the second computer, the processor generates processed time-series information, by including an identifier of a user who performs maintenance of the device and an identifier of a device to be maintained, as the operation information of the client terminal, and concealing the identifier of the user as personal information, and the processor searches for the personal time-series information including the personal information, with the search condition of the search range information received from the second computer to specify the user and the device to be maintained.

* * * * *